United States Patent [19]
Detterman

[11] Patent Number: 5,912,277
[45] Date of Patent: Jun. 15, 1999

[54] MEDIUM DENSITY CHLORINATED POLYVINYL CHLORIDE FOAM AND PROCESS FOR PREPARING

[76] Inventor: Robert Edwin Detterman, 355 Lakeview Dr., Medina, Ohio 44256

[21] Appl. No.: 09/017,893

[22] Filed: Feb. 3, 1998

Related U.S. Application Data

[63] Continuation of application No. 08/831,671, Apr. 10, 1997, Pat. No. 5,789,453.

[51] Int. Cl.⁶ .................................................. C08J 9/08
[52] U.S. Cl. ............................... 521/92; 521/93; 521/94; 521/99; 521/134; 521/139; 521/140; 521/145
[58] Field of Search .............................. 521/145, 94, 99, 521/92, 93, 134, 139, 140

[56] References Cited

U.S. PATENT DOCUMENTS

| | | |
|---|---|---|
| 2,996,049 | 12/1961 | Huska . |
| 3,100,762 | 8/1963 | Shockney . |
| 3,366,580 | 1/1968 | Kraemer, Jr. et al. . |
| 3,678,133 | 7/1972 | Ryan . |
| 3,796,779 | 3/1974 | Greenberg . |
| 3,975,315 | 8/1976 | Parks . |
| 4,165,415 | 8/1979 | Adachi et al. . |
| 4,360,602 | 11/1982 | Nehmey et al. .......................... 521/145 |
| 4,370,286 | 1/1983 | Nehmey et al. .......................... 521/145 |
| 4,383,048 | 5/1983 | Hall et al. ................................. 521/145 |
| 4,393,017 | 7/1983 | Kim et al. . |
| 4,401,612 | 8/1983 | Nehmey et al. . |
| 4,409,165 | 10/1983 | Kim . |
| 4,412,898 | 11/1983 | Olson et al. . |
| 4,413,065 | 11/1983 | Hall et al. ................................. 521/145 |
| 4,766,156 | 8/1988 | Kimura et al. . |
| 4,772,637 | 9/1988 | Kimura et al. . |
| 4,785,023 | 11/1988 | Kimura et al. . |
| 4,980,383 | 12/1990 | Shimazu et al. . |
| 5,216,088 | 6/1993 | Cindar et al. . |

FOREIGN PATENT DOCUMENTS

| | | |
|---|---|---|
| 0 308 871 A2 | 2/1988 | European Pat. Off. . |
| 2 302 521 | 7/1974 | Germany . |
| 1184688 | 9/1967 | United Kingdom . |
| WO 95/06554 | 3/1995 | WIPO . |

OTHER PUBLICATIONS

P23 02 521.0 a translation of German Patent Disclosure Publication DE–OS 2 302 521 published Jul. 25, 1973.
Volume 23, Encyclopedia of Chemical Technology, 3$^{rd}$ Ed. pp. 900–901 published by Wiley Interscience, New York, Jan. 1, 1983.
Rigid Vinyl Foam Applications (4 pages of slides) from Rohm and Haas.
The Influence of Blowing Agent Type on the Properties of Extruded PVC Foam, published about Jan. 1, 1993 in Cellular Plastics, available from Chemical Abstracts, Columbus, OH.
Handbook of Polymeric Foams and Foam Technology by Klempner and Frisch, published by Hanser Publishers, Munich, Sep. 1, 1991.
Foam Rigid Vinyl for Building Products, by Schipper, et al. of Elf Atochem, No Date.
Encyclopedia of Polymer Science and Engineering, vol. 2, pp. 434, 438–442, published by Wiley Interscience, New York, Jan. 1, 1985.
Rigid Foam Extrusion of Polyvinylchloride Effects of Blowing Agent and Plasticizer, pp. 2–12 in Journal of Polymer Engineering, published by Freund Publishing House, London, Jan. 1, 1986.
Foam Industry, by I.B. Page Schering Berlin Performance Additives, Cheshire England, at the 1994 ANTEC Proceedings.
Derwent abstract of Japanese document JP51024667 filed in Feb. 28, 1976; Trade Literature on Hydrocerol BIF (chemical blowing agent) from Boehringer Ingelheim Montvale, NJ, published Jul. 30, 1993.
Pages 613–635 of "Encyclopedia of PVC" by Ryan and Jalbert published by Dekker Publishing, Jan. 1, 1977.

*Primary Examiner*—Morton Foelak
*Attorney, Agent, or Firm*—Helen A. Odar

[57] ABSTRACT

The present invention relates to a medium density chlorinated polyvinyl chloride foam and the method of preparing such a foam using a blend of chemical blowing agents. The foam having a specific gravity in the range of about 0.3 to about 1.5 comprises chlorinated polyvinyl chloride, a blend of decomposition type blowing agents, a tin stabilizer, an optional impact modifier and an optional high molecular weight process aid.

35 Claims, 9 Drawing Sheets

MEDIUM DENSITY CHLORINATED POLYVINYL CHLORIDE FOAM AND PROCESS FOR PREPARING

CROSS-REFERENCE

This is a continuation of application Ser. No. 08/831,671, filed on Apr. 4, 1997, now U.S. Pat. No. 5,789,453 of Robert Edwin Deiterman, for MEDIUM DENSITY CHLORINATED POLYVINYL CHLORIDE FOAM AND PROCESS FOR PREPARING.

FIELD OF INVENTION

This invention relates to a medium density chlorinated polyvinyl chloride foam composition. In particular, the invention relates to a medium density foam composition having a substantially closed cell spherical structure and a specific gravity of approximately 0.3 to approximately 1.5, having thermal stability and improved impact resistance as compared to other medium density foams. Furthermore, the invention relates to the method of making such a medium density foamed composition using a blend of blowing agents, wherein such blend provides for a balance of properties, better than either blowing agent by itself.

BACKGROUND OF THE INVENTION

Foamed thermoplastic products are currently made using either physical or chemical blowing agents. Physical blowing agents are gases or liquids at temperatures below the processing temperatures of the thermoplastics. Generally, with physical blowing agents it is difficult to obtain uniform cell distribution due to the lack of uniformity of application of the physical blowing agent because of the difficulty in mixing the physical blowing agent with the highly viscous polymer melt. Furthermore, the addition of large amounts of physical blowing agents which are dissolved into a polymer dramatically decreases the polymer glass transition temperature making a highly plasticized mixture which is processed at lower temperatures thus allowing the processor to maintain the thermal stability of the polymer. Physical blowing agents are generally used in the formation of low density foams which generally have a specific gravity of less than 0.1.

Chemical blowing agents decompose or interact upon being heated to a temperature below the processing temperature of the thermoplastic and liberate a gaseous product in order to expand the thermoplastic. Chemical blowing agents by themselves are not generally used in low density foams because they are expensive and produce a limited reduction in density by themselves.

Foams made from chlorinated polyvinyl chloride, in particular, retain many of the properties of chlorinated polyvinyl chloride polymers such as heat resistance, chemical resistance, and weathering resistance, as compared to other thermoplastic polymers. Therefore, the foam of a chlorinated polyvinyl chloride can be used in a wide variety of applications.

For example, Adachi, et. al., in U.S. Pat. No. 4,165,415 discloses a method for preparing both low and medium density foams of CPVC. The method comprises impregnating a chlorinated polymer of vinyl chloride with a foaming agent consisting essentially of a lower aliphatic monohydric alcohol having between 1 to 5 carbon atoms. The foaming agent is considered a physical blowing agent. The mixture is then heated to a temperature and for a time sufficient to cause the mixture to foam in a closed mold.

U.S. Pat. No. 4,772,637 to Kimura, et. al., describes the method of preparing pre-expanded particles of CPVC containing a large amount of inorganic materials. The CPVC, inorganic materials and a solvent are kneaded to form a gel. The kneaded mixture is pelletized and a physical blowing agent is impregnated into the pellets. The pellets are then pre-expanded. The pre-expanded particles are then placed in a mold and heated with a heating source to expand and fill the mold in order to obtain a foamed article.

The abstract of Japanese Patent No. 51024667 describes a heat and flame resistant CPVC resin having a chlorine content of 63–69% in a nitrobenzene solution. An organic foaming agent such as azodicarbonamide, or dinitrosopentamethylene tetramine along with processing agents such as heat stabilizers, and lubricants were added. These ingredients were then foamed.

The abstract of Japanese Patent No. 5148381 discloses a composition which is foamed to give a five (5) millimeter cellular sheet with a density (sic) of 0.74. The composition is obtained by compounding dibutyl tin maleate, dioctyl tin maleate, a chemical foaming agent and an acrylic processing aid with a vinyl chloride polymer. The chemical foaming agent can be an azo compound, an azide compound, a nitroso compound, and/or a sulpho-hydrazide compound. The acrylic processing aid is a homopolymer or copolymer of methyl methacrylate, ethyl methacrylate, butyl methacrylate, copolymers of alkyarylates. and so forth.

German Patent Disclosure Publication No. DE-OS 2302521 describes a process for the preparation of a flexible thermoplastic foamed material. The patent describes heating a mixture of chlorinated polyethylene and chlorinated polyvinyl chloride and a blowing agent in a closed space at a temperature above the softening point of the chlorinated polymer and above the decomposition temperature of the blowing agent. The blowing agent that can be used in the process is azodicarbonamide.

U.S. Pat. No. 4,383,048 to Hall, et.al., discloses the process of making low density chlorinated polyvinyl chloride foam having a density of 0.32 grams/cubic centimeter or less. The low density foam that is produced that has a substantially closed cell structure, low thermal conductivity and excellent thermal stability without the substantial amounts of stabilizer required when azodicarbonamide is used as the nucleating agent. The foam is produced using a primary blowing agent which could be gaseous nitrogen and an alkali metal borohydride in conjunction with a proton donor activator as the nucleating agent.

A chlorinated polyvinyl chloride composition to be foamed is described in U.S. Pat. No. 4,370,286. The composition comprises a chlorinated polyvinyl chloride resin containing at least sixty (60%) percent chlorine, an effective amount of a blowing agent, an effective amount of a nucleating agent, a processing aid selected from copolymers of styrene and unsaturated nitrile containing more than fifty percent (50%) of styrene and ten to forty percent (10–40%) of nitrile. The foam formed from the composition is a low density foam.

U.S. patent application Ser. No. 08/580,563, filed Dec. 29, 1995, discloses a medium density chlorinated polyvinyl chloride foam composition comprising a chlorinated polyvinyl chloride polymer containing at least sixty percent (60%) chlorine by weight, a nitrogen containing decomposition type blowing agent, a tin stabilizer, a costabilizer and a high molecular weight process aid. However, this medium density foam lacks good impact resistance properties. Comparatively, the present invention has improved impact properties or at a minimum displays a less brittle mode of failure from those compositions set forth in U.S. patent application Ser. No. 08/580,563. Furthermore, one of the components of blend of the blowing agents used in this application acts as a costabilizer for the CPVC itself, precluding the need for a separate costabilizer.

Thus, there currently exists a need for a composition to form a medium density chlorinated polyvinyl chloride foam in which such foam has good dynamic thermal stability and color stability and improved impact resistance. In particular, a need exists for a medium density CPVC foam having chemical resistance, good weathering characteristics, and high service temperature or Vicat softening temperature.

SUMMARY OF THE INVENTION

The present invention comprises a novel medium density chlorinated polyvinyl chloride foam composition comprising a chlorinated polyvinyl chloride polymer containing at least sixty percent (60%) chlorine by weight, a blend of decomposition type blowing agent(s), a tin stabilizer, an optional impact modifier, and an optional high molecular weight process aid.

Preferably, the medium density chlorinated polyvinyl chloride foamed composition further includes an effective amount of lubricant(s).

The present invention also comprises the method of forming a medium density chlorinated polyvinyl chloride foam.

DETAILED DESCRIPTION

Figure 1:
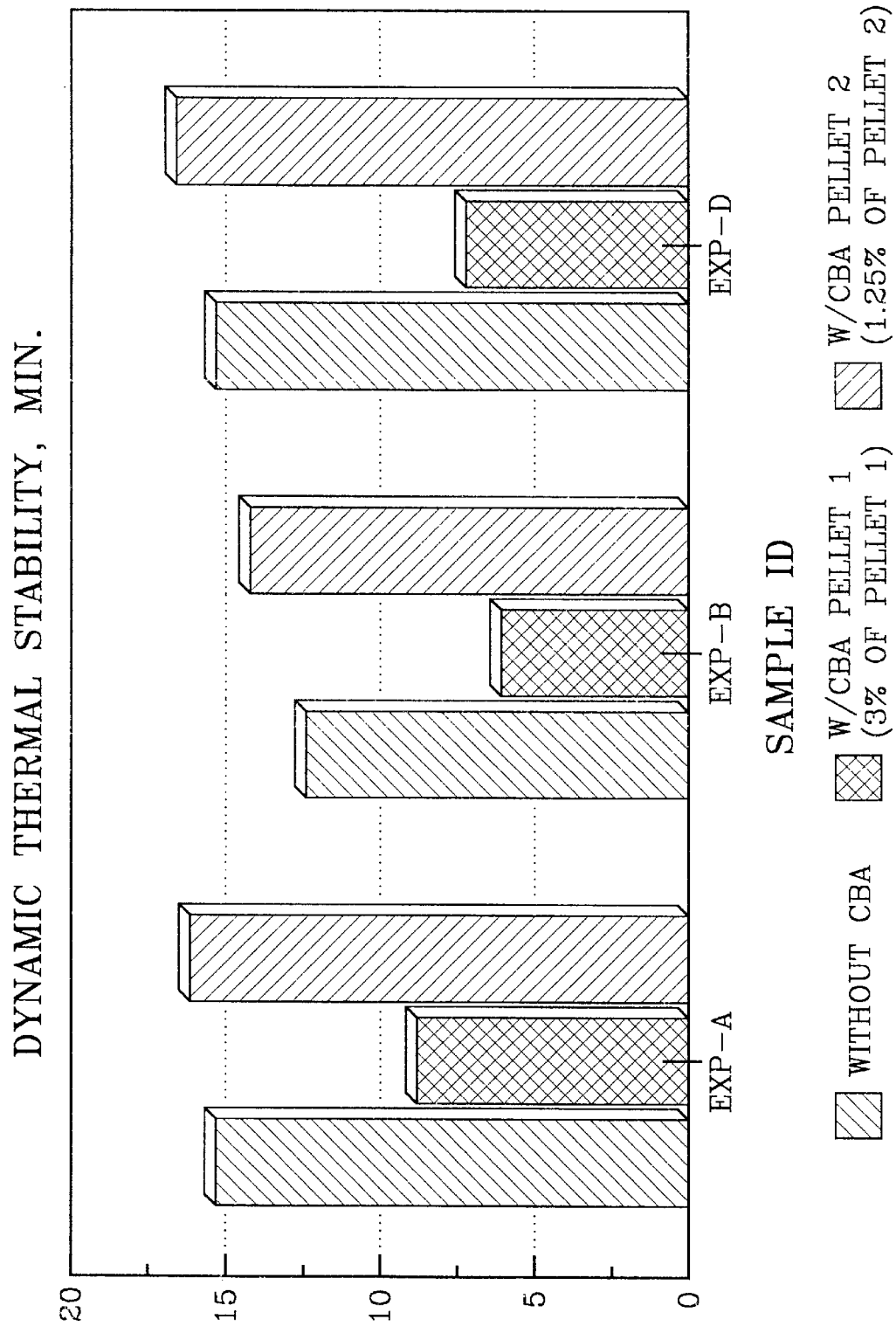
FIG. 1 is a bar graph setting forth the Dynamic Thermal Stability (DTS) results of Table 3.

The chlorinated polyvinyl chloride medium density foams of the present invention are prepared from compositions comprising chlorinated polyvinyl chloride polymer, a blend of two chemical blowing agents, a tin stabilizer, an optional impact modifier and an optional high molecular process aid. Other ingredients generally added to chlorinated polyvinyl chloride compositions, such as, for example, but not limited to lubricants, processing aids, fillers and pigments may also be included in the compositions. The medium density foams of the present invention are illustrated in FIGS. A–F. As seen in those figures, the medium density foams of the present invention are characterized as having a substantially closed cell spherical structure, a cell size substantially less than 500 microns, a specific gravity in the range of approximately 0.3 to approximately 1.5. The foam may have a densified skin if the foam is free blown. If found at all, the densified skin is very thin, generally ranging from approximately 1 mils to approximately 10 mils.

The chlorinated polyvinyl chloride polymer (CPVC) used in producing the medium density foam of the present invention refers to products obtained by post chlorinating a polymer of vinyl chloride (PVC). Vinyl chloride polymers include both homopolymers and copolymers of vinyl chloride, having a chlorine content up to 56.7% by weight based upon the total weight of the vinyl chloride polymer. Vinyl chloride polymers may be formed by mass, suspension or emulsion polymerization. Most preferably, the vinyl chloride polymers are formed by mass polymerization.

CPVC is obtained by chlorinating homoploymers or copolymers containing less than fifty percent (50%) by weight of one or more copolymerizable comonomers. Preferably, comonomers are not used. However, if used, suitable comonomers include acrylic and methacrylic acids; esters of acrylic and methacrylic acid wherein the ester portion has from 1 to 12 carbons; hydroxyalkyl esters of acrylic and methacrylic acid (for example hydroxymethyl methacrylate, hydroxyethyl acrylate, hydroxyethyl methacrylate and the like); glycidyl ester of acrylic and methacrylic acid (for example glycidyl acrylate, glycidyl methacrylate and the like); alpha,beta-unsaturated dicarboxylic acids and their anhydrides (for example maleic acid, fimaric acid, itaconic acid and the like); acrylamide and methacrylamide; acrylonitrile and methacrylonitrile; maleimides; olefins (for example ethylene, propylene, isobutylene, hexene and the like); vinylidene halide; vinyl esters; vinyl ethers; crosslinking monomers (for example, diallyl phthalate, ethylene glycol dimethacrylate, methylene bisacrylamide, divinyl ether, allyl silanes and the like).

Any post chlorination processes can be used to form CPVC polymer having more than fifty-seven percent (57%) by weight chlorine based upon the total weight of the polymer. Preferably, the CPVC polymer has a chlorine content in the range of about sixty percent (60%) to about seventy four percent (74%) by weight based upon the total weight of the polymer. The post chlorination processes which can be used include any commercial process or the like such as solution process, mass polymerization, fluidized bed process, water slurry process, thermal process or liquid chlorine process. In as much as the post chlorination processes are known to the art as well as the literature, they will not be discussed in detail here. Rather reference is hereby made to U.S. Pat. Nos. 2,996,049; 3,100,762; 4,412,898 and 5,216,088 which are hereby fully incorporated by reference as to the method of forming CPVC by post chlorinating PVC. A preferred process in forming the CPVC from the PVC is the aqueous suspension process disclosed in U.S. Pat. No. 4,412,898. However, the most preferred process to form CPVC is from a PVC made from a mass process.

In addition, blends of various CPVC resins can also be used. In those instances, the CPVC resin can be blended with another CPVC resin in an amount of other resin of about 1% to about 50% by weight based upon the total weight of the blended resin. Furthermore, the CPVC can be blended with PVC. The amount of PVC to be included ranges from about 1 to 50% by weight based upon the total weight of the blended resin.

The CPVC used in the invention desirably will have a fused density in the range of approximately 1.45 to 1.65 grams/cubic centimeter at 25° Centigrade, an inherent viscosity (I.V.) in the range of about 0.41 to about 1.15 and a chlorine content of at least sixty percent (60%) by weight based upon the total weight of the CPVC. The preferred fused density of the CPVC is in the range of about 1.5 to about 1.6 grams/cubic centimeter. The preferred inherent viscosity is in the range of about 0.5 to about 0.7. The preferred chlorine content of the CPVC is about 67% to about 68.5% by weight based upon the total weight of the CPVC. The most preferred chlorine content is 67% by weight based upon the total weight of the CPVC, with a 0.68 I.V. and a fused density of 1.5737 grams/cubic centimeter. Examples of suitable CPVC to use in forming the medium density foam of the instant invention include TempRite® 677×670 CPVC, TempRite® 637×670 CPVC and TempRite® 639×683 CPVC, all available from The B. F. Goodrich Company. "TempRite" is a registered trademark of The B. F. Goodrich Company. The preferred resins are TempRite® 687×563 CPVC and TempRite® 637×670 CPVC. The most preferred CPVC resin is TempRite® 637×670 CPVC.

The chemical blowing agents which are useful for foaming CPVC include blends of acid scavengers which generate gas with a nucleating blowing agent. The acid scavenger which also generates gas acts as a possible costabilizer for the CPVC. The acid scavenger must be able to react with hydrogen chloride which evolves during the degradation of the CPVC. An example of an acid scavenger which generates gas is a bicarbonate blowing agent. An example of nucleating agent is azodicarbonamide.

Examples of bicarbonate blowing agents include ammonium bicarbonate and sodium bicarbonate. A further discussion of these types of blowing agents can be found in the "Handbook of Polymeric Foams and Foam Technology" by Klempner, et.al., pages 380–381, incorporated herein by reference in their entirety. Examples of possible bicarbonate decomposition type blowing agents include Hydrocerol BIS and Hydrocerol BIF, available from Boehringer Ingelheim; Safoam P and Safoam FP, both available from the Balchem Corporation. In CPVC, the bicarbonate blowing agent releases a great volume of carbon dioxide. The rate of gas release is very fast. The use of the bicarbonate blowing agent improves the thermal stability of the compound. However, the processability of such a compound is poor and cell structure of the foam produced very coarse. The foamed material, however, does have excellent color retention.

The bicarbonate chemical blowing agent is blended with azodicarbonamide, a nitrogen containing decomposition type blowing agent. Azodicarbonamide has excellent blowing properties, promotes fine cell structure, evolves large amounts of gas when decomposed, when used alone. In addition, the azodicarbonamide behaves as a slower decomposer than the bicarbonate decomposition blowing agent on a volume per volume comparison. The preferred azodicarbonamides are Unicell D-200 and Unicell D-400, both available from Jong. The most preferred azodicarbonamide is Unicell D-200.

Furthermore, the azodicarbonamide by itself has an activation temperature in the range of about 185° C. to about 205° C., which raises the decomposition temperature of the blend of chemical blowing agents closer to the processing temperature of CPVC which is generally in the range of about 190° C. to about 220° C. The bicarbonate decomposition type blowing agent alone has an activation temperature around 120° C. It is believed that blending a bicarbonate chemical blowing agent with an azodicarbonamide blowing agent gives the foamed CPVC better thermal stability, color stability, and much better process control, than either agent by itself while maintaining the properties of the medium density foam. Furthermore, the foam formed by the blend has smaller cell structures than if solely the bicarbonate decompostion type blowing agent was used. Preferably the bicarbonate decomposition type blowing agent comprises from about 30 to about 60% by weight of the decomposition type blowing agent mixture, while the azodicarbonamide comprises from about 70 to about 40% by weight of the decomposition type blowing agent. Most preferably, the blend is a 50:50 ratio by weight of the two agents. An example of a commercially available blend of a bicarbonate blowing agent and azodicarbonamide is Exercol 232 from B. I. Chemicals, Inc. It is believed that the Exercol 232 comprises approximately 79% sodium bicarbonate and approximately 21% azodicarbonamide by weight of the Exercol 232. Additional azodicarbonanide is added to this commercial blend in the instant case. It is believed that as the azodicarbonamide level approaches the lower limit of about 40%, the processing melt flow stability of the blend is still maintained. However, as more of the azodicarbonamide is added into the decomposition type blowing agent mixture, the stability of the foamed CPVC will be diminished. Therefore, the optimum blend requires a balancing of benefits and detriment to the polymer itself. The range for the two components of the decomposition type blowing mixture provides high volume of gas release, and fast gas release reactions. The blend provides a positive effect on the thermal stability as compared to either of the two blowing agents in the blend. In addition, the blend provides CPVC foam which is easily processed and does not appear to have the cell structure significantly changed. Furthermore, the foam has good color retention.

The tin stabilizer used in the present invention can be any stabilizer containing tin. Suitable stabilizers include tin salts of monocarboxylic acids such as stannous maleate. Additionally, organo-tin stabilizers such as dialkyl tin mercaptides, carboxylates, and thiazoles can be used. Examples of such organo-tin stabilizers include without limitation: dibutyltin dilaurate, dibutyltin maleate, di(n-octyl) tin maleate, dibutyltin bis(lauryl mercaptide), dibutyltin, S,S-bis(isooctyl thioglycoate), dibutyltin β-mercaptoproprionate, di-n-octyltin S,S-bis(isooctyl thioglycolate), and di-n-octyltin β-mercaptoproprionate. Usually from about 1 to about 5 parts by weight of stabilizer per 100 parts by weight of chlorinated polyvinyl chloride is used in the composition. Most preferably, the composition uses 3.5 parts of butyl tin by weight thioglycolate per 100 parts of CPVC by weight. Examples of commercially available tin stabilizers include Mark 292-S from Witco Chemical and Thermolite 31 HF from Elf Atochem.

Figure 4:
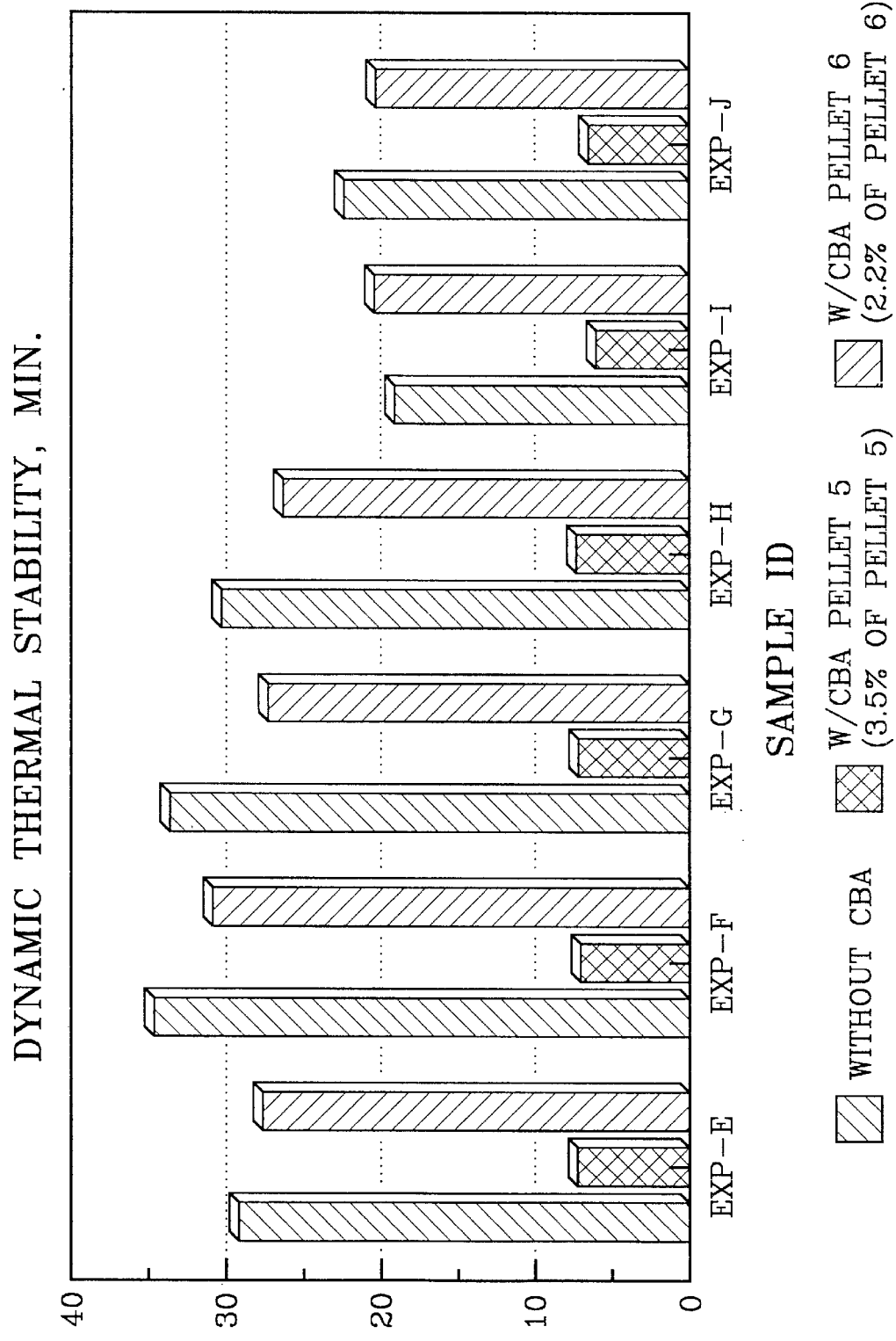
FIG. 4 is a bar graph showing the DTS of Table 14.
Figure 10:
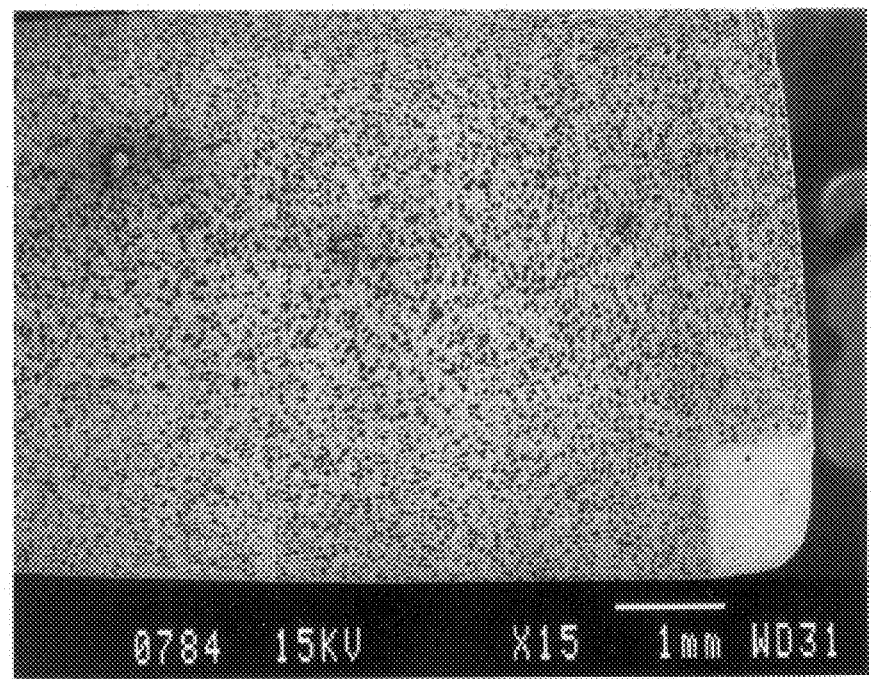
FIG. 10 is an electron micrograph at 15× magnification using a SEM illustrating a foamed CPVC sample blown using a 40/60 blend of blowing agent wherein azodicarbonamide is the minor portion of the blowing agent.
Figure 11:
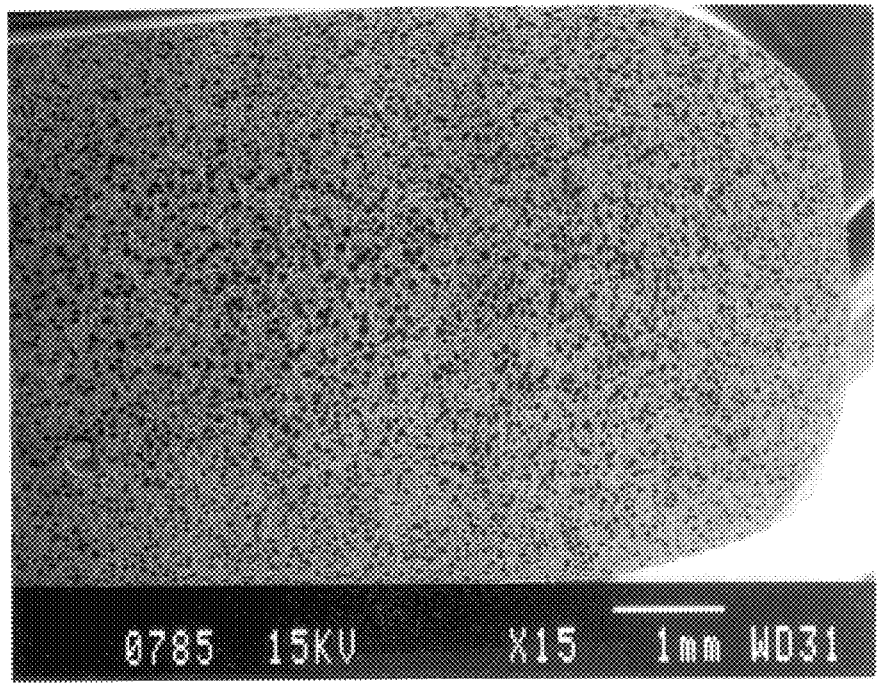
FIG. 11 is an electron micrograph at 15× magnification using a SEM illustrating a section of a foamed CPVC sample blown using a 20/80 blend of blowing agent wherein azodicarbonamide is the minor portion of the blowing agent.
Figure 12:
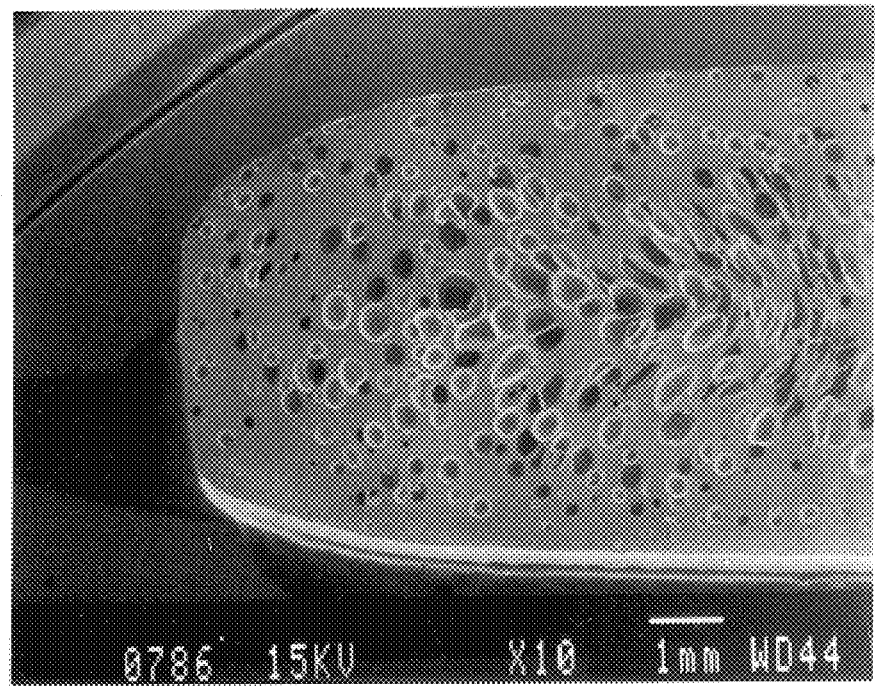
FIG. 12 an electron micrograph at 15× magnification using a SEM illustrating a section of a foamed CPVC foamed by 100% sodium bicarbonate blowing agent.

In addition to the tin stabilizer, the foamable composition may optionally contain a costabilizer. However, the costabilizer is not a necessary ingredient to make the medium density CPVC foam of the instant invention. In particular, when using the acid scavenger in the blend of blowing agents, the acid scavenger provides for costabilization. The results shown in FIGS. 4 and 10 illustrate this point. The costabilizer can be metal salts of phosphoric acids, or other acid acceptors that are not detrimental to the base CPVC resin used. Specific examples of metals salts of phosphoric acid include water-soluble, alkali metal phosphate salts, disodium hydrogen phosphate, orthophosphates such as mono-, di-, and triorthophosphates of said alkali metals, alkali metal phosphates and the like. Examples of acid acceptors not detrimental to the base CPVC resin include aluminum magnesium hydroxy carbonate hydrate, magnesium aluminum silicates and alkali metal alumino silicates. An example of a commercially available aluminum magnesium hydroxy carbonate hydrate is Hysafe 510, available from the J. M. Huber Company. Examples of magnesium aluminum silicates are molecular sieves such as for example Molsiv Adsorbent Type 4A from UOP. Examples of alkali metal alumino silicates are zeolites such as CBV 10A Zeolite Na-Mordenite by Synthetic Products Co. The most preferred costabilizer is disodium hydrogen phosphate (DSP). The DSP can be added separately to the foamable composition or can be added to the CPVC polymer during the processing of the CPVC polymer. Usually from about 0.1 to about 3 parts by weight of the costabilizer are added to the composition per 100 parts by weight of chlorinated polyvinyl chloride polymer, if added at all. In the preferred embodiment, 1.3 parts by weight of disodium hydrogen phosphate is added to 100 parts of the CPVC polymer. The costabilizer is superior to merely increasing the tin stabilizer level since increasing the amount of tin stabilizer lowers the heat deflection temperature of the foam and is undesirable in typical end use applications.

The medium density foamed composition of the instant invention also optionally contains an impact modifier. Examples of impact modifiers include acrylic impact modifiers, methacrylate-butadiene-styrene (MBS) impact modifiers, silicone rubber/acrylic copolymers impact modifiers, acrylonitrilebutadiene-styrene (ABS) impact modifiers and chlorinated polyethylene (CPE) impact modifiers. Generally when used, less than 10 parts by weight based upon 100 parts by weight of CPVC in the composition of the impact modifier are added to the foamed CPVC composition. The preferred impact modifiers include acrylic impact modifiers, MBS impact modifiers, silicone rubber/acrylic copolymer and ABS impact modifiers. The most preferred impact modifiers are acrylic impact modifiers.

U.S. Pat. No. 3,678,133 describes the compositions conventionally referred to as acrylic impact modifiers. Generally, as stated in column 2, the impact modifier is a composite interpolymer comprising a multi-phase acrylic base material comprising a first elastomeric phase polymerized from a monomer mix comprising at least 50 wt. % of an alkyl acrylate having about 2–8 carbon atoms in the alkyl group and a minor amount of a crosslinking agent and a second rigid thermoplastic phase polymerized from a monomer mix comprising at least 50% alkyl methacrylate having 1–4 carbon atoms in the alkyl group and having a molecular weight of from 50,000 to 600,000. (Lines 10–20). Further, the patent states that the polymerization of the rigid thermoplastic phase is preferably conducted in such a fashion that substantially all of the rigid phase material is formed on or near the surface of the elastomeric phase. (Lines 34–39). Acrylic impact modifiers are polyacrylates including ($C_4$–$C_{12}$) acrylate homo or copolymers, second stage graft polymerized with methyl methacrylate, polybutyl acrylate jointly graft copolymerized with methyl methacrylate and styrene, poly(ethylhexyl acrylate-co-butyl acrylate) graft copolymerized with styrene, and/or acrylonitrile and/or methylmethacrylate; polybutyl acrylate graft polymerized with acrylonitrile and styrene (Blendex 975, 977 or 979 (Blendex is a trademark of GE Plastics)). Other commercial embodiments are available from Rohm & Haas under the trademarks Paraloid KM 334, KM 365 and KM 330. The most preferred acrylic impact modifier is Paraloid KM 330 impact modifier. If used as an impact modifier in the composition, 10 parts by weight based upon 100 parts by weight of CPVC in the composition of the Paraloid KM 330 acrylic impact modifier are added.

MBS impact modifiers are graft polymers. Generally MBS impact modifiers are prepared by polymerizing methyl methacrylate or mixtures of methyl methacrylate with other monomers in the presence of polybutadiene or polybutadiene-styrene rubbers. When added to the foamed CPVC composition, about 5 to about 15 parts by weight based upon 100 parts by weight of CPVC in the composition of MBS impact modifiers are used. Preferably, 5 to about 10 parts by weight based upon 100 parts by weight of CPVC in the composition of MBS impact modifier are used. Most preferably, 6 parts by weight based upon 100 parts by weight of CPVC in the composition are used. Examples of commercially available MBS impact modifiers include Kane Ace B-56 and Kane Ace B-22, available from Kaneka; and Paraloid KM 680, available from Rohm & Hass. The most preferred impact modifier is Kane Ace B-56.

Polyorganosiloxane impact modifiers can also be used. The most preferred impact modifier is composed of a mixture of a polyorganosiloxane and a polyalkyl (meth) acrylate. Preferably, the impact modifier contains about 10–90% by weight of the polyorganosiloxane and from about 10 to 90% by weight of a polyalkyl (meth)acrylate.

The polyorganosiloxane may be prepared by emulsion polymerization using an organosiloxane and a crosslinking agent as described hereinafter. At that time, a grafting agent may further be used.

The organosiloxane may be various types of cyclic siloxanes of at least three-membered ring, preferably from 3- to 6-membered cyclosiloxanes. For example, it is believed hexamethylcyclotrisiloxane, octamethylcyclotetrasiloxane, decamethylcyclo-pentasiloxane, dodecamethylcyclohexasiloxane, trimethyltriphenylcyclotrisiloxane, tetramethyltetraphenylcyclotetrasiloxane and octaphenylcyclotetrasiloxane can be used. These organosiloxanes may be used alone or in combination as a mixture of two or more different types. The organosiloxane is used in an amount of at least 50% by weight, preferably at least 70% by weight of the polyorganosiloxane.

The crosslinking agent for the organosiloxane may be a trifinctional or tetrafunctional silane type crosslinking agent such as trimethoxymethylsilane, triethoxyphenylsilane, tetramethoxysilane, tetraethoxysilane, tetra-n-propoxysilane or tetrabutoxysilane. Tetrafunctional crosslinking agents are particularly preferred, and among them tetraethoxysilane is especially preferred. The crosslinking agent is used usually in an amount of from 0.1 to 30% by weight in the polyorganosiloxane.

The grafting agent for the organosiloxane may be a compound capable of forming a unit represented by the formula:

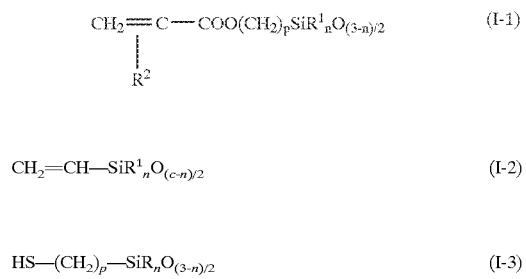

$$CH_2=CH-SiR^1{}_nO_{(c-n)/2} \quad (I\text{-}2)$$

or $$HS-(CH_2)_p-SiR_nO_{(3-n)/2} \quad (I\text{-}3)$$

wherein $R^1$ is a methyl group, an ethyl group, a propyl group or a phenyl group. $R^2$ is a hydrogen atom or a methyl group, n is 0, 1 or 2, and p is a number o from 1 to 6.

The polyorganosiloxane can be prepared by any method in which the organosiloxane, the crosslinking agent and optionally the grafting agent are mixed. The preparation is well within the scope of one of ordinary skill in the art, and does not form part of this invention.

The polyorganosiloxane can be compounded with (meth) acryloyloxysiloxane capable of forming the unit of the formula (I-1). A methacryloyloxysilane is particularly preferred as the compound capable of forming the unit of the formula (I-1). Specific examples of the methacryloyloxysilane include β-methacryloyloxyethyldimethoxymethylsilane, τ-methacryloyloxypropylmethoxydimethylsilane, τ-methacryloyloxypropyldimethoxymethylsilane, τ-methacryloyloxypropyltrimethoxysilane, τ-methacryloyloxypropylethoxydiethylsilane, τ-methacryloyloxypropyldiethoxymethylsilane and δ-methacryloyloxybutyldiethoxymethylsilane. The grafting agent is used usually in an amount of from 0 to 10% by weight in the polyorganosiloxane.

The polyalkyl (meth)acrylate may be prepared using an alkyl (meth)acrylate, a crosslinking agent and a grafting agent. The alkyl (meth)acrylate may be an acryl acrylate such as methyl acrylate, ethyl acrylate, n-propyl acrylate, n-butyl acrylate or 2-ethylhexyl acrylate, or an alkyl methacrylate such as hexyl methacrylate, 2-ethylhexyl methacrylate or n-lauryl methacrylate. It is particularly preferred to use n-butyl acrylate. The crosslinking agent for the alkyl (meth)acrylate may be, for example, ethylene glycol dimethacrylate, propylene glycol dimethacrylate, 1,3-butylene glycol dimethacrylate or 1,4-butylene glycol dimethacrylate. The grafting agent for the alkyl (meth) acrylate may be, for example, allyl methacrylate, triallyl cyanurate or triallyl isocyanurate. Allyl methacrylate can be used alone as a crosslinking agent. The preparation of the polyalkyl (meth)acrylate is well within the scope of one of ordinary skill in the art and does not form part of this invention.

The two components, the polyorganosiloxane and the polyalkyl (meth)acrylate, can be polymerized together to form the impact modifier in a manner such as for example described by European Patent EP 0308871 A2, incorporated herein by reference. Any other method may be used to combine the two components, including those known within the art. The polymerization of the two components is well within the scope of one of ordinary skill in the art and does not form part of this invention.

The preferred impact modifier contains polydimethyl siloxane. Most preferably, the impact modifier comprises a butyl acrylate-methyl methacrylate-poly(dimethyl siloxane) copolymer. An example of a commercially available polyorganosiloxane impact modifier is Metablen-S-2001 manufactured by the Mitsubishi Rayon Co. and available from Metco North America. Desirably, from about 2 parts to about 15 parts by weight of the impact modifier containing polyorganosiloxane are added to the composition to be foamed. Preferably, 6 parts by weight of the impact modifier containing a polyorganosiloxane are added to the composition.

Similarly, ABS impact modifiers can be used in the foamed CPVC composition. ABS modifiers are usually prepared by polymerizing styrene and acrylonitrile in the presence of polybutadiene rubber. Examples of commercially available ABS impact modifiers which can be used in the instant invention include Blendex 338, Blendex 310 and Blendex 311; all available from GE Plastics. If used as the impact modifier of choice, approximately 5 parts to about 15 parts by weight based upon 100 parts by weight of CPVC in the composition of ABS impact modifier are used. Preferably, 6 parts by weight based upon 100 parts by weight of CPVC in the composition of the ABS impact modifier are used.

Chlorinated polyethylene (CPE) impact modifiers can also be used. Generally these CPE impact modifiers are lower molecular weight impact modifiers. Generally, these CPE impact modifiers should have a weight average molecular weight in the range of about 70,000 to about 96,000; and a number average molecular weight in the range of 18,000 to about 24,000. These CPE impact modifiers are prepared by chlorinating high-density polyethylene. These chlorinated polyethylene impact modifiers have a specific gravity of from about 1.13 to 1.4, preferably 1.16 and a residual crystallinity of from about 0 to 25%, preferably 0 to 10% and a chlorine content from about 25% to about 45% by weight based upon 100 parts by weight of CPE impact modifiers, preferably 35 to 44%. The chlorination can be either homogeneous or heterogeneous. Chlorination methods for CPE include aqueous suspension, solution or gas phase methods. The preferred method is by suspension chlorination. CPE is commercially available from DuPont Dow under the tradename Tyrin 3611P CPE, Tyrin 3615P CPE, and Tyrin 4211P CPE. Similarly, another example of a commercial CPE is Elaslen 303BS CPE, available from Showa Denko. The preferred CPEs include DuPont Dow Tyrin 4211P CPE and Tyrin 3611P CPE. The most preferred CPE is Tyrin 4211P CPE. Preferably, 6 parts by weight based upon 100 parts by weight of CPVC in the composition of the CPE impact modifier are used, if used at all.

A high molecular weight process aid is optionally included in the foam composition. The high molecular weight process aids are necessary to provide melt elasticity or melt strength of the polymer melt formed within the extruder and high integrity of the foam cell walls during extrusion. High molecular weight process aids can be either acrylic process aids or copolymers of styrene and acrylonitrile. Suitable high molecular weight process aids include those high molecular weight process aids known in the art. The acrylic process aids which can be used in the instant invention are thermoplastic polymethyl methacrylate homo or copolymers with weight average molecular weights greater than 1,000,000. Hard, glassy copolymers of styrene and acrylonitrile having a glass transition temperature in excess of 60° C. and a dilute solution viscosity greater than 1.5 as measured in methylethyl ketone at 4% concentration and is selected from copolymers if styrene and an unsaturated nitrile containing more than 50% of said styrene and 10 to 40% of said nitrile are examples of the styrene acrylonitrile process aids. Examples of styrene-acrylonitrile polymers suitable for use in the foamable composition are Goodrite 2301x6, manufactured by the Zeon Company and Blendex 869 from General Electric Plastics. If added at all, 10 parts by weight of the styrene acrylonitrile copolymer are added to the composition per 100 parts by weight of CPVC polymer. Generally, the higher the weight average molecular weight of the acrylic process aids, and the less acrylic processing aid should be added. Examples of suitable acrylic process aids include poly(methyl methacrylate) available under the trade name Paraloid K-400, Paraloid K-128N, Paraloid K-125, all from Rohm & Haas; and the trade name Kaneka PA 10, Kaneka PA 20 and Kaneka PA 30, all three from Kaneka Texas. Another suitable acrylic process aid includes 2-propenoic acid, 2-methyl ester polymer with butyl 2-propinoate. This acrylic process aid is commercially available as Metablen P530 from Elf Atochem. If Metablen P530 is used as the acrylic process aid, generally about 2 parts by weight based upon 100 parts by weight of CPVC in the composition are used. Generally, from about 2 to about 20 parts by weight of the acrylic process aid are added per 100 parts by weight of CPVC. Preferably, from about 6 to about 10 parts by weight of the acrylic process aid are added per 100 parts by weight of CPVC. Most preferably, 6 parts by weight of an acrylic process aid per 100 parts by weight of CPVC are used, if used at all.

The foam composition preferably includes lubricants or lubricant mixtures. This includes any lubricants known to those in the art. Suitable lubricants include for example but not limited to various hydrocarbons such as paraffin; paraffin oils; low molecular weight polyethylene; oxidized polyethylene; amide waxes, metal salts of fatty acids; esters of fatty acids such as butyl stearate; fatty alcohols, such as cetyl, stearyl or octadecyl alcohol; metal soaps such as calcium or zinc salts of oleic acid; fatty amides of organic acids; polyol esters such as glycerol monostearate, hexaglycerol distearate and mixtures thereof. Examples of possible fatty acids to be used include but are not limited to stearic acid and calcium stearate. Examples of fatty amides of organic acids include stearamide, and ethylene-bis-stearamide. Since several lubricants can be combined in countless variations, the total amount of lubricant can vary from application to application. Optimization of the particular lubricant composition is not within the scope of the present invention and can be determined easily by one of ordinary skill in the art. Generally from about one to about ten parts by weight of lubricant are added to the foam composition per one hundred parts by weight of CPVC polymer. Preferably the following mixture of lubricants is used: Glycolube 674, an ester of a fatty acid (available from the Lonza Co.); Loxiol G-70, a proprietary fatty acid ester, (available from Henkel) and Aristowax 145, a paraffin wax (available from Unocal). In the preferred embodiment, the lubricant package includes 1.5 parts by weight of oxidized polyethylene, 0.5 parts by weight of the proprietary fatty acid ester and 0.5 parts of a fatty acid (based upon 100 parts by weight of CPVC polymer) are added to the foam composition.

The foamable composition may also possibly include a metal release agent if desired, but not necessary. Metal release agents are materials which are incompatible with the polymer melt and lubricate the melt against the surface in which the material is being processed. An example of a metal release agent is a terpolymer of methylmethacrylate, styrene and butyl acrylate. The terpolymer of methylmethacrylate, styrene and butyl acrylate is available under the trade name of Paraloid K-175, available from Rohm & Haas. Preferably 1.0 parts by weight of this terpolymer per 100 parts of CPVC are added to the composition.

The foam composition may also optionally include an activator. Generally, such an activator is used when a lower temperature for the foamable composition is desired in the extruder as well as when complete decomposition of the nitrogen containing blowing agent is desired. The activator helps the portion of the nitrogen containing decomposition type blowing agent to decompose faster and to generate more gases than when not used. Examples of suitable activators include tin salts of monocarboxylic acids and organo tin stabilizers. Examples of such organo-tin stabilizers include without limitation: dibutyltin dilaurate, dibutyltin maleate, di(n-octyl) tin maleate, dibutyltin bis(lauryl mercaptide), dibutyltin, S,S-bis(isooctyl thioglycoate), dibutyltin $\beta$-mercaptoproprionate, di-n-octyltin S,S-bis(isooctyl thioglycolate), and di-n-octyltin $\beta$-mercaptoproprionate. The most preferred activator is dibutyl tin dilaurate. The activator may be included in any amount useful to cause the activation. An example of an activator is Thermolite 149 from the Elf Atochem Company. Generally, 0.5 parts by weight of activator may be included per 100 parts by weight of CPVC. However, use of such activator may reduce the heat distortion temperature of the final foam.

In addition, enhancing ingredients useful to enhance either the processing of a CPVC or the CPVC foam product can be included in the foamable composition. These include for example but not limited to pigments, such as titanium dioxide, carbon black, and iron oxide, fillers such as calcium carbonate, silica and the like, reinforcing agents such as glass fibers, and graphite fibers or glass spheres, other processing aids, impact modifiers, and alloying agent and the like, antioxidants, and antistatics. An example of an alloying agent is chlorinated polyethylene. Any chlorinated polyethylene can be used as the alloying agent. If an alloying polymer is used, preferably 0 to 5 parts by weight of the alloying polymer are added per 100 parts by weight of CPVC. Preferably, 3 parts of chlorinated polyethylene per 100 parts by weight of CPVC polymer are included in the composition. An example of a suitable chlorinated polyethylene to be used in the instant invention includes Tyrin 3611P CPE and Tyrin 4211P CPE from the DuPont Dow Chemical Company. These enhancing ingredients can be added in an amount effective for the intended purpose. The amount and use of the alloying agent would be within the purview of one of ordinary skill in the art and does not form part of this invention.

The ingredients for the foamable composition can be combined in any convenient manner and formed into a foam by the free blown or Celuka process or any process known in the art to foam. For example, all the ingredients can be mixed together uniformly by mixing means such as a Henschel high intensity mixer or other mixing means and then added to an extruder equipped with heating elements. Any extruder useful for processing of CPVC polymer can be used to foam the foamable composition provided the die is appropriately chosen. Preferably, a short land length is desired in the extruder die. Examples of suitable extruders include the Cincinnati Milacron CM-55 counter-rotating conical screw extruder and the Davis Standard 2.5 inch single screw extruder. The amount of the blowing agent, the extruder temperature and the screw speed of the extruder can be varied to obtain the desired specific gravity of the foamed product, and these determinations are well within the skill of one of ordinary skill in the art. As the foam composition goes through the extruder, it is heated and converted into a viscous melt. The chemical blowing agent is also activated and begins to decompose when the melt reaches a temperature of approximately 120° Centigrade to approximately 200° Centigrade. However, although the gases are formed due to the decomposition of the blowing agent, the foamable composition does not expand while in the extruder. When the hot foam composition is discharged from the extruder through the extruder head into the atmosphere which has reduced pressure, the blowing agent expands the foam composition into the desired cellular product.

Alternatively, a two pellet system can be used in the free blown process. In this system, the CPVC polymer, tin stabilizer, impact modifier (if used), the costabilizer (if used), high molecular weight process aid (if used) and lubricant package can be mixed in an extruder. The extrudate can be cubed or otherwise pelletized to form the first pellet and stored for latter processing. In addition to the chemical blowing agent, other optional enhancing ingredients as well as a polymer alloying agent such as chlorinated polyethylene can be mixed together in an extruder at a temperature below the decomposition temperature of the chemical blowing agent to form the second pellet. In the preferred embodiment, 2.1 parts by weight of chlorinated polyethylene are added to the chemical blowing agent to form the second pellet. Preferably, either Tyrin 3611P CPE or 4211P CPE are used. Most preferably, Tyrin 4211P CPE is used. The extrudate can be cubed or otherwise pelletized and stored for processing as the second pellet. The first and second pellets are the same size to promote uniform blending. When desired, the first and second pellets or cubes can be mixed together and extruded. As described above, the composition expands into a foam when the extrudate reaches the atmosphere.

The preferred method of mixing the ingredients of the foamable composition is the two pellet method. First, this method gives the flexibility to decide the amount of blowing agent to be added to the composition and thereby customizing the density of the foamed CPVC. Second, due to the difficulty in processing CPVC directly from powder, it is beneficial that a high work input melt fusion can be used in forming the first set of pellets, otherwise one may encounter inconsistent foaming. Further, the first pellet can be dried in a desiccant dryer to remove moisture which is often undesirable since moisture is a physical blowing agent and if uncontrolled, may result in uncontrollable foaming.

There are many uses of the medium density foam composition. For example, the composition can be used in woodlike fenestration components, such as for example but not limited to, window and door components. In addition, the foam can be used for construction, electrical and fluid handling applications such as roofing, siding, fencing, electrical junction boxes, plenum materials, track lighting, electrical enclosures, automotive; aircraft and mass transit interiors; drain, waste, and vent pipes; and other low pressure pipes.

The following non-limiting examples serve to further illustrate the present invention in greater detail.

EXAMPLES

In the Examples, the two pellet method is generally used. "CBA" refers to the chemical blowing agent. In the Examples references to amounts of ingredients in parts indicate the number of parts by weight based upon a total of 100 parts by weight of CPVC in the composition, and references to amounts of ingredients in percentages (e.g. 69%) in the various pellets indicate the percent by weight of the total pellet composition.

TABLE 1

PELLET "A" - SERIES 1

| | EXP. A parts | EXP. B parts | EXP. C parts | EXP. D parts |
|---|---|---|---|---|
| TempRite 677x670, CPVC Resin, Suspension Grade, 0.68 IV, 67% Cl, without DSP formed from Geon 110x440 PVC from The Geon Co. | 100.0 | 100.0 | 100.0 | 100.0 |
| Mark 2925, Tin Stabilizer from Witco | 3.5 | 3.50 | 3.50 | 3.5 |
| Goodrite 2301x36, Acrylic Processing Aid Zeon Company | 4.0 | 4.00 | 4.00 | 4.0 |
| Metablen S-2001, Silicone/Acrylic Impact Modifier, Meteo North America | 6.0 | | | |
| Kane Ace B-56, MBS Impact Modifier, Kaneka | | 6.00 | | |
| Tyrin 2000 CPE, DuPont Dow Co. | | | 6.00 | |
| Paraloid KM334, Acrylic Impact Modifier, DuPont Dow | | | | 10.0 |
| AC629-A, Oxidized Polyethylene, Allied Signal | 1.5 | 1.50 | 1.50 | 1.5 |
| G-70 Beads, Fatty Acid Ester Wax, Henkel Loxiol | 1.0 | 1.00 | 1.00 | 1.0 |
| Microthene FN 510, Low Molecular Weight Polyethylene, Quantum Chemical Corp. | 0.5 | 0.50 | 0.50 | 0.5 |
| Irganox 1010, Antioxidant, Ciba-Geigy Corp. | | 0.25 | 0.25 | |
| Tioxide R-FC 6, Tioxide America, Inc. | 3.0 | 3.00 | 3.00 | 3.0 |

TABLE 2

PELLET B'S SERIES 1

| CBA Pellet 1 | |
|---|---|
| 69% Dow Tyrin 4211P | CPE (CBA carrier agent) |
| 31% Unicell D-200 | Azodicarbonamide CBA |
| CBA Pellet 2 | |
| 69% Dow Tyrin 4211P | CPE (CBA carrier agent) |
| 31% Exocerol 232 | Commercial Bicarbonate/Azodicarbonamide CBA blend |
| CBA Pellet 3 | |
| 81.5% Dow 4211P | CPE (CBA carrier agent) |
| 15.5% Exocerol 232 | Bicarbonate/Azodicarbonamide CBA blend |
| 3% Pigment | Red Pigment, Harshaw Citation B-1051, Engelhard Corp. |
| CBA Pellet 4 | |
| 81.5% Dow Tyrin 3615P | CPE (CBA carrier agent) |
| 15.5% Exocerol 232 | Bicarbonate/Azodicarbonamide CBA blend |
| 3% Pigment | Blue Pigment, Irgalite Blue BCS, Ciba Geigy Corp. |

The follwing tests were performed on the mixtures of Pellet A and B as set forth in Table 3:

| | |
|---|---|
| Dynamic Thermal Stability Test | Described Below |
| Izod Impact Test, Notched at 72° F. | ASTM D-256 |
| Tensile Strength Test at 72° F. | ASTM D-638 |
| Flexural Strength Test at 72° F. | ASTM D-790 |
| Coefficient of Thermal Expansion (CTE), −30 to +30 C., × 10−5 in/in C. | ASTM D-696 |
| Specific Gravity | ASTM D-792 |

The Dynamic Thermal Stability Test (DTS Test) is a procedure developed by The B. F. Goodrich Company to determine the dynamic thermal stability (DTS) of CPVC compounds. DTS is defined as the time required to raise the machine torque on a Brabender Electronic Plasticorder, Model EPL-VS501 (Type 6, 60/83 MC, 3:2 drive ratio, Type SB Roller Type Rotors, Stainless Steel 376) by 100 metergrams from the lowest torque attached by the polymer set at a given temperature and mixing rotor speed. Connected to the Brabender Electronic Plasticorder drive unit is an electrically heated Haake Rheomix fusion head.

In all the DTS Tests run in these Examples, 70 grams of sample/1.50 specific gravity were used, mixing bowl temperature of 194° C., loading time 2 minutes, loading and preheat time of 3.0 minutes. The rotor speed was 35 rpm. The Brabender Electronic Plasticorder was operated in accordance with the instructions set forth in the operating manual. The torque was recorded.

These tests show the degradation effects of the CBA on CPVC resins.

TABLE 3

SERIES 1 OF EXPERIMENTS-RESULTS

| Pellet A | EXP A | EXP B | EXP C | EXP D |
|---|---|---|---|---|
| w/o CBA | | | | |
| Time, min. | 15.3 | 12.4 | 15.3 | 15.2 |
| Torque, mg. | 2190 | 2300 | 2000 | 2180 |
| Temperature, ° C. | 209 | 211 | 208 | 210 |
| DTS: w/3% CBA Pellet 1 | | | | |
| Time, min. | 8.8 | 6.0 | 7.4 | 7.2 |
| Torque, mg. | 2200 | 2300 | 2080 | 2200 |
| Temperature, ° C. | 209 | 209 | 208 | 210 |
| DTS: w/1.25% CBA Pellet 2 | | | | |
| Time, min. | 16.1 | 14.2 | 16.7 | 16.6 |
| Torque, mg. | 2230 | 2360 | 2090 | 2200 |
| Temperature, ° C. | 211 | 209 | 208 | 209 |
| Izod Impact, w/o CBA, in.-lb./in. | 1.7C | 8.9P | | 5.5C |
| Tensile Strength, w/o CBA @ Yield, psi. | 7120 | 7270 | | 6790 |
| w/o CBA @ Break | 6430 | 5880 | | 6060 |
| Modulus, w/o CBA, psi. | 373,000 | 397,000 | | 343,000 |
| % Elongation | 30 | 25 | | 53 |
| Flexural Strength, w/o CBA, psi. | 13,623 | 13,910 | | 12,859 |
| Modulus, w/o CBA, psi. | 395,713 | 403,775 | | 370,441 |
| CTE, w/o CBA × 10−5 in/in C | 7.13 | 6.92 | | 7.78 |
| Specific Gravity, w/o CBA, g/cc | 1.49 | 1.48 | | 1.47 |

The results of Table 3, Series 1 Experiments are set forth in a bar graph in FIG. 1.

The following conclusions can be drawn from this series of experiments. First, the blend of the bicarbonate/azodicarbonamide blowing agent improves the thermal stability of the compound which can be foamed as compared to the azodicarbonamide itself. Second, adding azodicarbonamide blowing agent itself results in degradation of the CPVC compound used to form the medium density foam. Third, the bicarbonate blowing agent in the blend acts as a costabilizer in the CPVC compound.

The effect of the various impact modifiers on the CPVC foam compounds were studied as set forth in Table 4. In this table, the letters "C" and "P" characterize the type of break that occurs. "C" means complete break, where "P" means partial break in the Notched Izod Impact Test.

Table 5 sets forth the properties of the compositions in Table 4 combined with a blowing agent. In this table, a VHIT value designated as "D" indicates it was ductile, whereas "T" indicates it was transitional.

TABLE 4

| Pellet A | EXP A | EXP B | EXP C | EXP D |
|---|---|---|---|---|
| TempRite 677×670, CPVC, 68 I.V., 67% CL | X | X | X | X |
| Process Aid | X | X | X | X |
| Silicone/Acrylic Impact Modifier | X | | | |
| MBS Impact Modifier | | X | | |
| CPE Impact Modifier | | | X | |
| Acrylic Impact Modifier | | | | X |
| DTS, w/o CBA | | | | |
| Time, min. | 15.3 | 12.4 | 15.3 | 15.2 |
| w/3% CBA Pellet 1 | | | | |
| Time, min. | 8.8 | 6.0 | 7.4 | 7.2 |
| w/1.25% CBA Pellet 2 | | | | |
| Time, min. | 16.1 | 14.2 | 16.7 | 16.6 |
| Izod Impact, w/o CBA, in.-lb./in. | 1.7 C | 8.9 P | | 5.5 C |
| CTE, w/o CBA × 10−5 in/in C | 7.13 | 6.92 | | 7.78 |

TABLE 5

| Pellet A/Pellet B | EXP. A with 31% Azodicarbonamide | EXP. A with 31% Exocerol 232 | EXP. B with 31% Azodicarbonamide | EXP. B with 15.5% Exocerol 232 | EXP. D with 31% Azodicarbonamide | EXP. D with 31% Exocerol 232 |
|---|---|---|---|---|---|---|
| % CBA Pellet B used: | 3.00 | 1.25 | 3.00 | 2.50 | 3.00 | 1.25 |
| Approximate Density | 0.92 | 0.70 | 0.81 | 0.68 | 0.89 | 0.76 |
| Lab Spec. Grav. | 0.89 | 0.77 | 0.80 | 0.83 | 0.92 | 0.69 |
| Izod Impact | 0.38/C | 0.51/C | 0.75/C | 0.91/C | 0.41/C | 1.25/C |
| Vhit, ⅜", in.lb/mil. X | 0.33/D | 0.33/D | 0.32/D | 0.22/D | 0.33/D | 0.33/D |
| Tensile @ Yield | 2,780.00 | 2,320.00 | 2,320.00 | 2,910.00 | 3,190.00 | 1,930.00 |
| @ Break | 2,900.00 | 2,380.00 | 2,460.00 | 2,870.00 | 3,290.00 | 2,000.00 |
| Modulus | 149,000.00 | 120,000.00 | 126,000.00 | 160,000.00 | 173,000.00 | 107,000.00 |
| % Elongation | 34.00 | 23.00 | 36.00 | 23.00 | 38.00 | 23.00 |
| Flexural Strength | 6,020.00 | 4,886.00 | 4,884,00 | 5,780.00 | 7,375.00 | 4,262.00 |
| Modulus | 165,543.00 | 141,021.00 | 130,729.00 | 164,187.00 | 200,670.00 | 122,106.00 |

The results in this Table indicate that the use of a higher molecular weight chlorinated polyethylene as a carrier agent in Pellet B does not change the foam density, processability or the foam properties developed.

The following series of experiments, set forth in Tables 6 and 7, were carried out on a 2½ inch Davis Standard Extruder having the following profile extrusion metering screw configuration:

| Screw | 2½ in. | 60 mm diameter |
|---|---|---|
| L/D | 24:1 | |
| Feed | 5 @ 0.400", 5flights | |
| Transition | , 7flights | |
| Metering 12 @ 0.200" exit depth, | 12flight | |

In addition, there are 4 rows of interruption mixing pins set forth in the metering region of the screw. These mixing pins are arbitrarily placed in the metering region to interrupt the flow.

TABLE 6

| Pellet A/ *CBA Pellet 2 Pellet B | EXP. A CBA Pellet 2 | EXP. B CBA Pellet 4 | EXP. C CBA Pellet 2 | EXP. D CBA Pellet 3 |
|---|---|---|---|---|
| Barrel: | | | | |
| zone #1, ° F. | 340 | 340 | 340 | 340 |
| zone #2, ° F. | 350 | 350 | 350 | 350 |
| zone #3, ° F. | 360 | 360 | 360 | 360 |
| zone #4, ° F. | 360 | 360 | 360 | 360 |
| Die #1, ° F. | 360 | 360 | 360 | 360 |
| Screw, rpm | 20 | 20 | 20 | 20 |
| Amps | 13 | 13 | 11 | 13 |
| Head Press, psi | 1760 | 1840 | 1780 | 1900 |
| Stock Temp, ° F. | 398 | | | 396 F. |
| Rate, lbs/hr | 100 | | | 103 |
| Rough density | 0.70 | 0.68 | | 0.76 |

TABLE 7

| Pellet A/ CBA Pellet B | EXP. A/ 3% CBA Pellet 1 | EXP. B/ 13% CBA Pellet 1 | EXP. C/ 3% CBA Pellet 1 | EXP. D/ 3% CBA Pellet 1 |
|---|---|---|---|---|
| Barrel: | | | | |
| zone #1, ° F. | 350 | 345 | 345 | 345 |
| zone #2, ° F. | 360 | 355 | 355 | 355 |
| zone #3, ° F. | 370 | 365 | 365 | 365 |
| zone #4, ° F. | 370 | 365 | 365 | 365 |
| Die #1, ° F. | 370 | 365 | 365 | 365 |
| Screw, rpm | 25 | 25 | 25 | 25 |
| Amps | 12.5 | 13 | 11 | 13 |
| Head Press, psi | 1760 | 1620 | 1670 | 1870 |
| Rate, lbs/hr | 121 | 114 | 118 | 116 |
| Rough density | 0.92 | 0.81 | n.a. | 0.89 |

Note:
All Pellet "A" blended w/3% CBA Pellet 1

In the next series of experiments, the following compositions for Pellets A and Pellet B, set forth in Tables 8 and 9 were used:

TABLE 8

SERIES 2 OF EXPERIMENTS

| Pellet A | EXP. E parts | EXP. F parts | EXP. G parts | EXP. H parts | EXP. I parts | EXP. J parts |
|---|---|---|---|---|---|---|
| TempRite 673x670, Suspension Grade 0.68 IV, 67.0% Cl with DSP, (Base PVC: Geon 110x440) | 75 | 75 | 75 | 75 | 75 | 75 |
| TempRite 639x683, Suspension Grade 0.51 IV, 68.5% Cl with DSP, (Base PVC: Vista 5225) | 25 | 25 | 25 | 25 | 25 | 25 |
| Mark 292S, Tin Stabilizer, Witco Corp. | 3 | 3 | 3 | 3 | 3 | 3 |
| Metablen P530, from Elf Atochem | | | 2 | 4 | | |
| Goodrite 2301x36, Acrylic Processing Aid, Zeon Chemical | 4 | | | | 6 | 6 |
| Paraloid KM 330, Acrylic Impact Modifier, DuPont Dow | 10 | 10 | 10 | 10 | | |
| Kane Ace B-56, MBS Impact Modifier, Kaneka | | | | | 6 | |
| Blendex 338, ABS Impact Modifier, GE Plastics | | | | | | 6 |
| AC 629A, Oxidized Polyethylene, Allied Signal | 1.5 | 1.5 | 1.5 | 1.5 | 1.5 | 1.5 |
| G-70 Beads, Fatty Acid Ester Wax from Henkel Loxiol | 1.0 | 1.0 | 1.0 | 1.0 | 1.0 | 1.0 |

TABLE 8-continued

SERIES 2 OF EXPERIMENTS

| Pellet A | EXP. E parts | EXP. F parts | EXP. G parts | EXP. H parts | EXP. I parts | EXP. J parts |
|---|---|---|---|---|---|---|
| Microthene FN-510, Low Molecular Weight Polyethylene | 0.5 | 0.5 | 0.5 | 0.5 | 0.5 | 0.5 |
| Tioxide R-FC 6, Titanium dioxide, Tioxide America, Inc. | 3 | 3 | 3 | 3 | 3 | 3 |

TABLE 9

Pellet B's

| CBA Pellet 5 | |
|---|---|
| 67% Dow 4211P | CPE (CBA carrier agent) |
| 31% Unicell D-200 | Azodicarbonamide CBA |
| 2% Pigment | Yellow Pigment—(Irgazine 3-RLT-N, available from Ciba Geigy) |

| CBA Pellet 6 | |
|---|---|
| 82.5% Dow Tyrin 4211P | CPE (CBA carrier agent) |
| 15.5% Exocerol 232 | Commercial Bicarbonate/ Azodicarbonamide CBA blend |
| 0.2% Pigment | Yellow Pigment |
| 1.8% Pigment | Blue Pigment (Irgalite Blue BCS, available from Ciba Geigy) |

| CBA Pellet 7 | |
|---|---|
| 82.5% DuPont Dow Tyrin 4211P | CPE (CBA carrier agent) |
| 15.5% Hydrocerol BIF | Bicarbonate CBA |
| 2.0% Pigment | Blue Pigment (Irgalite Blue BCS, available from Ciba Geigy) |

The effect of CBA blend ratios on Experiment E, Pellet A, was studied below in Table 10. The following results were obtained for the DTS Test described in further detail and carried out at 194° C. bowl temperature, with a rotor blade speed at 35 RPM. The pellets (70 grams) are introduced into the DTS head with a 3 min. load/soak, before the test is obtained. The purpose of these experiments was to attempt to determine the optional blend of an azodicarbonamide/bicarbonate CBA required to extrude a medium density CPVC foamed profile with good processability.

Plate-Out in Table 10 refers anything incompatible with the polymer, and coats the interior of metal surfaces.

The conclusions that can be drawn from this series of experiments includes the following. First, displacing the azodicarbonamide CBA with bicarbonate CBA does not mean that the cells in the foam will become coarser in a linear fashion. The addition of the azodicarbonamide tends to nucleate the microvoid (since the nitrogen cannot diffuse easily through the CPVC) into a well dispersed manner and the bicarbonate CBA's $CO_2$ gas expands the void but the cell diameter remains much smaller than if the bicarbonate was used alone. The DTS tests clearly show the advantage of using as much bicarbonate CBA in a blend as the processing will allow.

Figure 2:
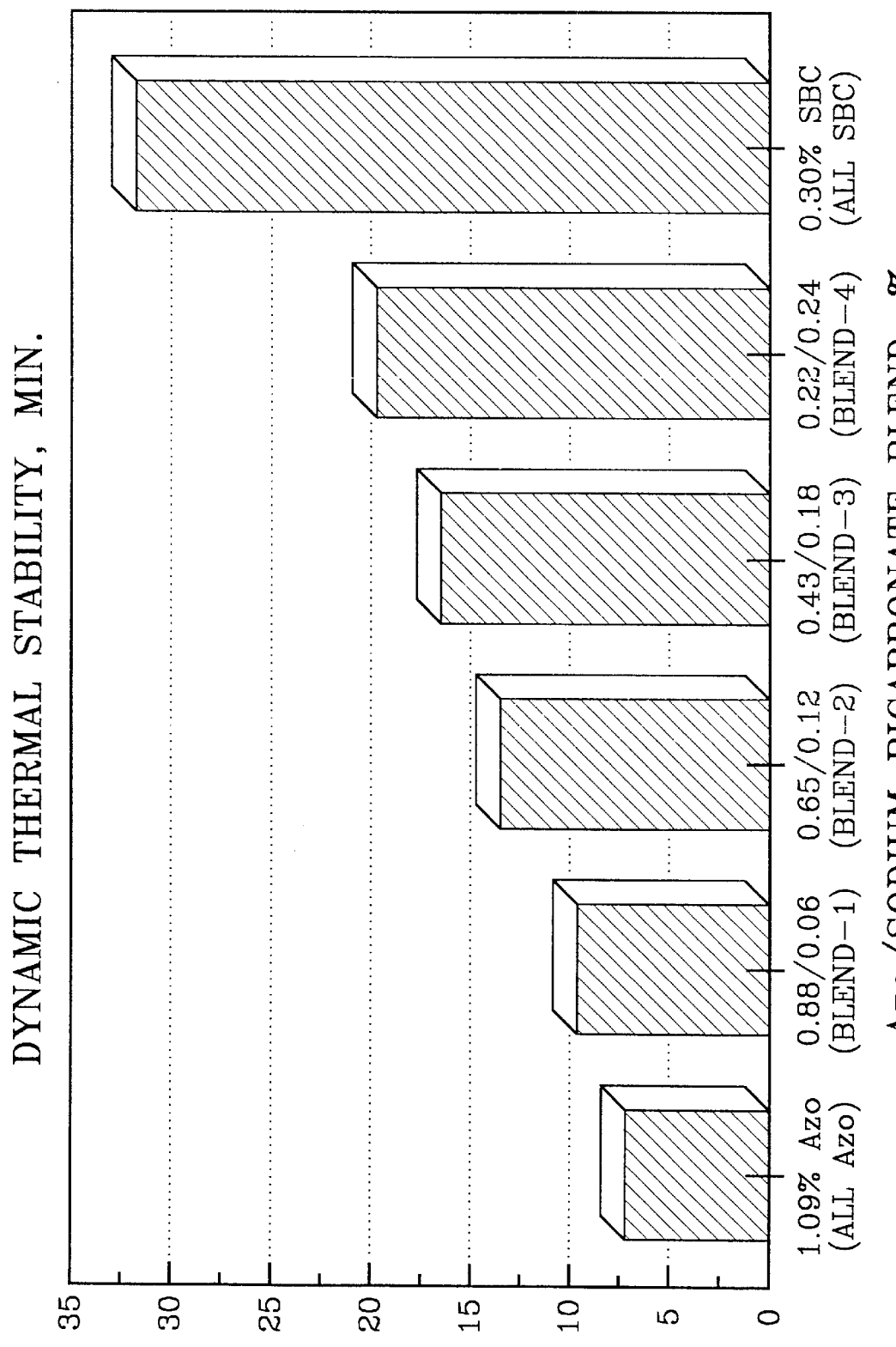
FIG. 2 shows the results of the DTS experiments carried out for the compositions in Table 10 in bar graph form.

Table 10 are shown in Bar Graph form in FIG. 2. SBC in this Figure refers to sodium bicarbonate.

The tests set forth in Table 11 were carried out on the 2½" Davis Standard Extruder, set according to the same configuration as set forth for Tables 6 and 7 above.

TABLE 10

|  | 10-0 | 10-1 | 10-2 | 10-3 | 10-4 | 10-5 | 10-6 |
|---|---|---|---|---|---|---|---|
| Pellet A, Exp. E | 100 | 100 | 100 | 100 | 100 | 100 | 100 |
| 3.5% CBA Pellet 5 (31% azodicarbonamide) |  | 1.09 | 0.88 | 0.65 | 0.43 | 0.22 | — |
| 1.99% CBA Pellet 7 (15% bicarbonate) |  | 0 | 0.06 | 0.12 | 0.18 | 0.24 | 0.3 |
| DTS Test |  |  |  |  |  |  |  |
| Time, min. | 26.5 | 7.2 | 9.6 | 13.5 | 16.5 | 19.7 | 31 |
| Torque, mg | 2200 | 2200 | 2260 | 2210 | 2210 | 2210 | 22 |
| Temperature, ° C. | 211 | 209 | 210 | 211 | 211 | 211 | 21 |
| Plate-Out | LT. | Med. | LT. | LT. | LT. | LT. Med. | — |

TABLE 11

| Pellet A | EXP. E | EXP. E Blend 1 | EXP. E Blend 2 | EXP. E Blend 3 | EXP. E Blend 4 | EXP. E |
|---|---|---|---|---|---|---|
| Pellet B | 3.5% CBA 5 Pellet 5 | 2.8% CBA Pellet 5 0.38% CBA Pellet 7 | 2.1% CBA Pellet 5 0.77% CBA Pellet 7 | 1.4% CBA Pellet 5 1.16% CBA Pellet 7 | 0.7% CBA Pellet 5 1.55% CBA Pellet 7 | 1.94% CBA Pellet 7 |
| Barrel: | | | | | | |
| zone #1, °F. | 340 | 340 | 340 | 340 | 340 | 340 |
| zone #2, °F. | 355 | 355 | 355 | 355 | 355 | 355 |
| zone #3, °F. | 365 | 365 | 365 | 365 | 365 | 365 |
| zone #4, °F. | 365 | 365 | 365 | 365 | 365 | 365 |
| Die #1, °F. | 365 | 365 | 365 | 365 | 365 | 365 |
| Screw, rpm | 20 | 20 | 20 | 20 | 20 | 20 |
| Amps | 13 | 12 | 12 | 12 | 12 | 12 |
| Head Press, psi | 1495 | 1470 | 1520 | 1490 | 1495 | 1500 |
| Rate, lbs/hr | | 98 | 102 | 99 | | |
| Rough density | 0.86 | 0.81 | 0.79 | 0.75 | 0.75 | 0.89 |
| Comments: | Good Control; Low Center Flow; Easy to Size | Good Control; More Center Flow; Easy to Size | Good Control; Easy to Size | Slightly Less Control; Center Void; Slight Pulsation | Same as Blend #3; Broke 2x, pulsation | Unsizable; Chatter in sizer; Pulsation |

Figure 3:
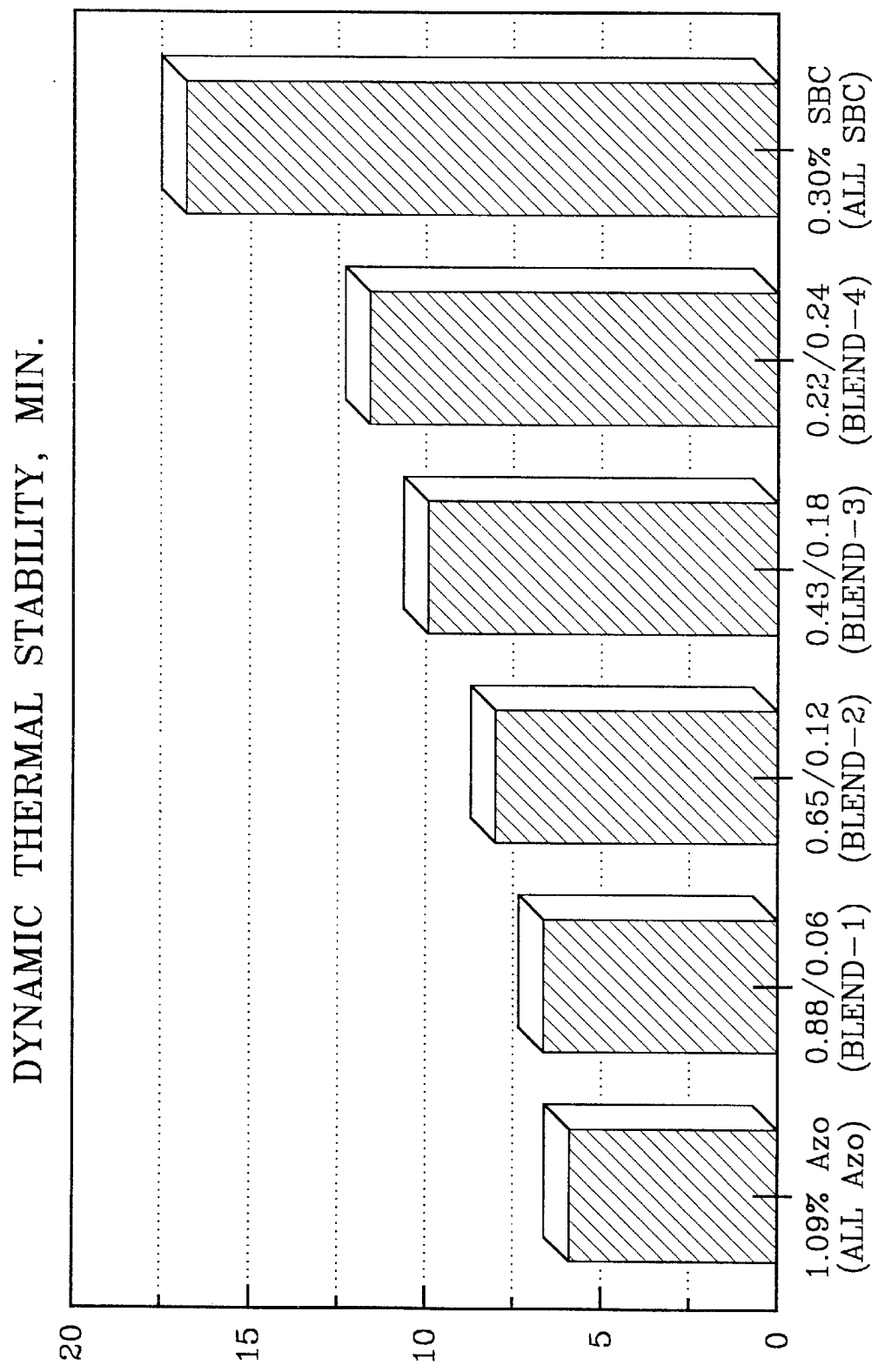
FIG. 3 is a bar graph showing the DTS of the experimental compounds set forth in Table 12.

The bar graph in FIG. 3 illustrates the DTS results of the experiments set forth in Table 12. From these results, one can conclude that even without the conventional costabilizer, pages 9–10 added to the CPVC, the blend of a bicarbonate/azodicarbonamide CBA provides improved processability over the use of just an azodicarbonamide CBA or a bicarbonate CBA. This affirms the conclusion that the bicarbonate functions as a costabilizer for the CPVC compound itself.

The effect of CBA blend ratios on DTS was also studied in conjunction with Pellet A, Exp. D. The same conditions for DTS as used in Table 10 are used in this Table 12.

TABLE 12

|  | 12-1 | 12-2 | 12-3 | 12-4 | 12-5 | 12-6 |
|---|---|---|---|---|---|---|
| Pellet A, Exp. D | 100 | 100 | 100 | 100 | 100 | 100 |
| Pellet B, | | | | | | |
| 3.5% CBA Pellet 5 (% azodicarbonamide) | 1.09 | 0.88 | 0.65 | 0.43 | 0.22 | — |

TABLE 12-continued

|  | 12-1 | 12-2 | 12-3 | 12-4 | 12-5 | 12-6 |
|---|---|---|---|---|---|---|
| 1.94% CBA Pellet 7 (% bicarbonate) | — | 0.06 | 0.2 | 0.18 | 0.24 | 0.30 |
| Test, DTS | | | | | | |
| Time (min.) | 5.9 | 6.6 | 8.0 | 9.9 | 11.6 | 16.0 |
| Torque (mg.) | 2230 | 2260 | 2250 | 2200 | 2200 | 2200 |
| Temperature (°C.) | 208 | 209 | 209 | 210 | 211 | 211 |
| Plate Out | Med–Hvy. | Medium | Light | Slight | Very Slight | None |

CONCLUSIONS

The recipe for Pellet A, Exp. E was used in the foamed composition in Table 13. The results are set forth therein. These results indicate that the blend of an azodicarbonamide/bicarbonate produces a medium density foam having thermal stability and improved impact resistance.

TABLE 13

| Pellet A | EXP. E Solid | EXP. E Foamed | Blend 1 EXP. E Foamed | Blend 2 EXP. E Foamed | Blend 3 EXP. E Foamed | Blend 4 EXP. E Foamed | EXP. E |
|---|---|---|---|---|---|---|---|
| Pellet B Azodicarbonamide, % | | 1.09 | 0.88 | 0.65 | 0.43 | 0.22 | |
| Sodium Bicarbonate, % | | | 0.06 | 0.12 | 0.18 | 0.24 | 0.30 |
| DTS Test: | | | | | | | |
| Time, min. | 26.5 | 7.2 | 9.6 | 13.5 | 16.5 | 19.7 | 31.7 |
| Torque, mg | 2200 | 2200 | 2260 | 2210 | 2210 | 2210 | 2200 |
| Temperature, °C. | 211 | 209 | 210 | 211 | 211 | 211 | 210 |
| Plate-out | sl. | med. | sl. | sl. | sl. | sl–med. | clean |
| Density (actual) | 1.486 | 0.79 | 0.79 | 0.79 | 0.76 | 0.74 | 0.94 |
| Izod Impact, in.-lb./in. | 1.7C | 0.3C | 0.4C | 0.3C | 0.3C | 0.3C | 0.5H-C |
| Tensile Strength @ Yield, psi. | 6660 | 2180 | 2120 | 2040 | 2010 | 2010 | 2500 |
| @ Break, psi. | 5620 | 2340 | 2260 | 2180 | 2130 | 2120 | 2500 |
| Modulus, psi | 326,000 | 121,000 | 121,000 | 117,000 | 112,000 | 114,000 | 140,000 |
| % Elongation | 15 | 34 | 32 | 27 | 25 | 26 | 13 |
| Flexural Strength, psi. | 12,715 | 4434 | 4361 | 4384 | 4136 | 4345 | 6146 |
| Modulus, psi. | 363,793 | 113,245 | 114,222 | 118,991 | 112,716 | 119,077 | 160,971 |
| CTE, x 10-5 in/in C | | | | | | | |

Table 14 set forth below investigates the use of different impact modifiers. The standard tests, set forth with respect to Table 3, were also carried out.

TABLE 14

| Pellet A | EXP. E | EXP. F | EXP. G | EXP. H | EXP. I | EXP. J |
|---|---|---|---|---|---|---|
| DTS Test: | | | | | | |
| Without CBA | | | | | | |
| Time, min. | 29.2 | 34.6 | 33.6 | 30.3 | 19.0 | 22.3 |
| Torque, mg | 2300 | 2290 | 2400 | 2450 | 2450 | 2450 |
| Temperature, ° C. | 210 | 210 | 209 | 211 | 211 | 211 |
| Plate-out | none | sl. | sl. | med. | hvy. | sl.–med. |
| 3.5% CBA Pellet 5 | | | | | | |
| (w/1.09% Azodicarbonamide) | | | | | | |
| Time, min. | 7.2 | 7.0 | 7.1 | 7.2 | 6.0 | 6.4 |
| Torque, mg. | 2280 | 2280 | 2320 | 2400 | 2380 | 2350 |
| Temperature, ° C. | 209 | 209 | 209 | 208 | 209 | 210 |
| Plate-out | med. | med. | med. | med–hvy. | hvy. | med–hvy. |
| 1.94% CBA Pellet 6 | | | | | | |
| (w/.30% Exocerol 232) | | | | | | |
| Time, min. | 27.7 | 30.8 | 27.3 | 26.3 | 20.4 | 20.2 |
| Torque, mg | 2370 | 2300 | 2320 | 2400 | 2400 | 2390 |
| Temperature, ° C. | 210 | 210 | 210 | 210 | 210 | 210 |
| Plate-out | none | sl–med. | sl. | sl. | med. | med. |
| Specific Gravity | 1.486 | 1.507 | 1.457 | 1.491 | 1.481 | 1.479 |
| Izod Impact | 1.66C | 2.09C | 2.92C | 2.27C | 1.65C | 1.24C |
| Vhit | | | | | | |
| Tensile Strength, @ Break, psi. | 6660 | 6660 | 6010 | 6620 | 7070 | 7370 |
| @ Yield, psi. | 5620 | 5910 | 5350 | 5880 | 6370 | 6420 |
| Modulus, psi. | 326,000 | 341,000 | 304,000 | 340,000 | 362,000 | 381,000 |
| % Elongation | 15 | 34 | 58 | 36 | 26 | 23 |
| Flexural Strength, psi. | 12,715 | 12,399 | 11,277 | 12,484 | 13,326 | 14,072 |
| Modulus, psi. | 363,793 | 357,152 | 335,775 | 363,006 | 398,483 | 412,281 |

The results of Table 14 are set forth in the bar graph shown as FIG. 4. These results illustrate that the blend of a azodicarbonamide and bicarbonate blowing agent provides better overall results in terms of stability and foaming as compared to just azodicarbonamide or bicarbonate blowing agent alone. Furthermore, the acrylic impact modified compounds were more thermally stable than those compounds modified with MBS or ABS.

Table 15 shows the properties of various foamed compounds. The target was to achieve a foam density of about 0.75 to about 0.80.

TABLE 15

| Pellet A | EXP. E | EXP. E | EXP. F | EXP. F | EXP. G | EXP. G |
|---|---|---|---|---|---|---|
| Pellet B | CBA Pellet 5 | CBA Pellet 6 | CBA Pellet 5 | CBA Pellet 6 | CBA Pellet 8 | CBA Pellet 6 |
| % CBA used: | 3.5 | 2.2 | 3.5 | 2.2 | 3.5 | 2.2 |
| Rough Density | 0.88 | 0.89 | 0.90 | 0.73 | 0.94 | 0.69 |
| Density (actual) | 0.85 | 0.78 | 0.88 | 0.71 | 0.93 | 0.66 |
| Izod Impact, in.-lb./in. | 0.3C | 0.3C | 0.3C | 0.3C | 0.3C | 0.3C |
| Vhit, ⅜", in.lb./mil. | 0.24/D | 0.15/D | 0.24/D | 0.19/D | 0.30/D | 0.30/D |
| Tensile Strength @ Yield, psi. | 2270 | 2070 | 2290 | 1690 | 2670 | 1800 |
| @ Break, psi. | 2410 | 2100 | 2500 | 1810 | 2840 | 1870 |
| Modulus, psi. | 133,000 | 120,000 | 129,000 | 95,000 | 152,000 | 105,000 |
| % Elongation | 31 | 13 | 41 | 22 | 40 | 19 |
| Flexural Strength, psi. | 4906 | 3607 | 4630 | 3566 | 5556 | 3806 |
| Modulus, psi. | 125,750 | 99,859 | 125,310 | 102,248 | 144,165 | 108,582 |
| Pellet A | EXP. H | EXP. H | EXP. I | EXP. I | EXP. J | EXP. J |
| Pellet B | CBA Pellet 5 | CBA Pellet 6 | CBA Pellet 5 | CBA Pellet 6 | CBA Pellet 5 | CBA Pellet 6 |
| % CBA used: | 3.5 | 2.0 | 3.5 | 2.0 | 3.5 | 2.0 |
| Rough Density | 0.89 | 0.75 | 0.78 | 0.70 | 0.89 | 0.99 |
| Density (actual) | 0.89 | 0.74 | 0.76 | 0.70 | 0.84 | 0.90 |
| Izod Impact, in.-lb./in. | 0.3C | 0.3C | 0.3C | 0.3C | 0.3C | 0.3C |
| Vhit, ⅜", in.lb./mil. | 0.34/C | 0.36/D | 0.27/D | 0.28/D | 0.19/T | 0.16/T |
| Tensile @ Yield, psi. | 2620 | 2090 | 2320 | 1990 | 2770 | 2660 |
| @ Break, psi. | 2740 | 2170 | 2460 | 2040 | 2800 | 2680 |

TABLE 15-continued

| Modulus, psi. | 149,000 | 117,000 | 136,000 | 115,000 | 170,000 | 158,000 |
| --- | --- | --- | --- | --- | --- | --- |
| % Elongation | 37 | 26 | 33 | 19 | 17 | 13 |
| Flexural Strength, psi. | 5901 | 4904 | 4973 | 4598 | 4594 | 3999 |
| Modulus, psi. | 160,139 | 138,396 | 128,983 | 128,396 | 127,557 | 109,676 |

Figure 5:
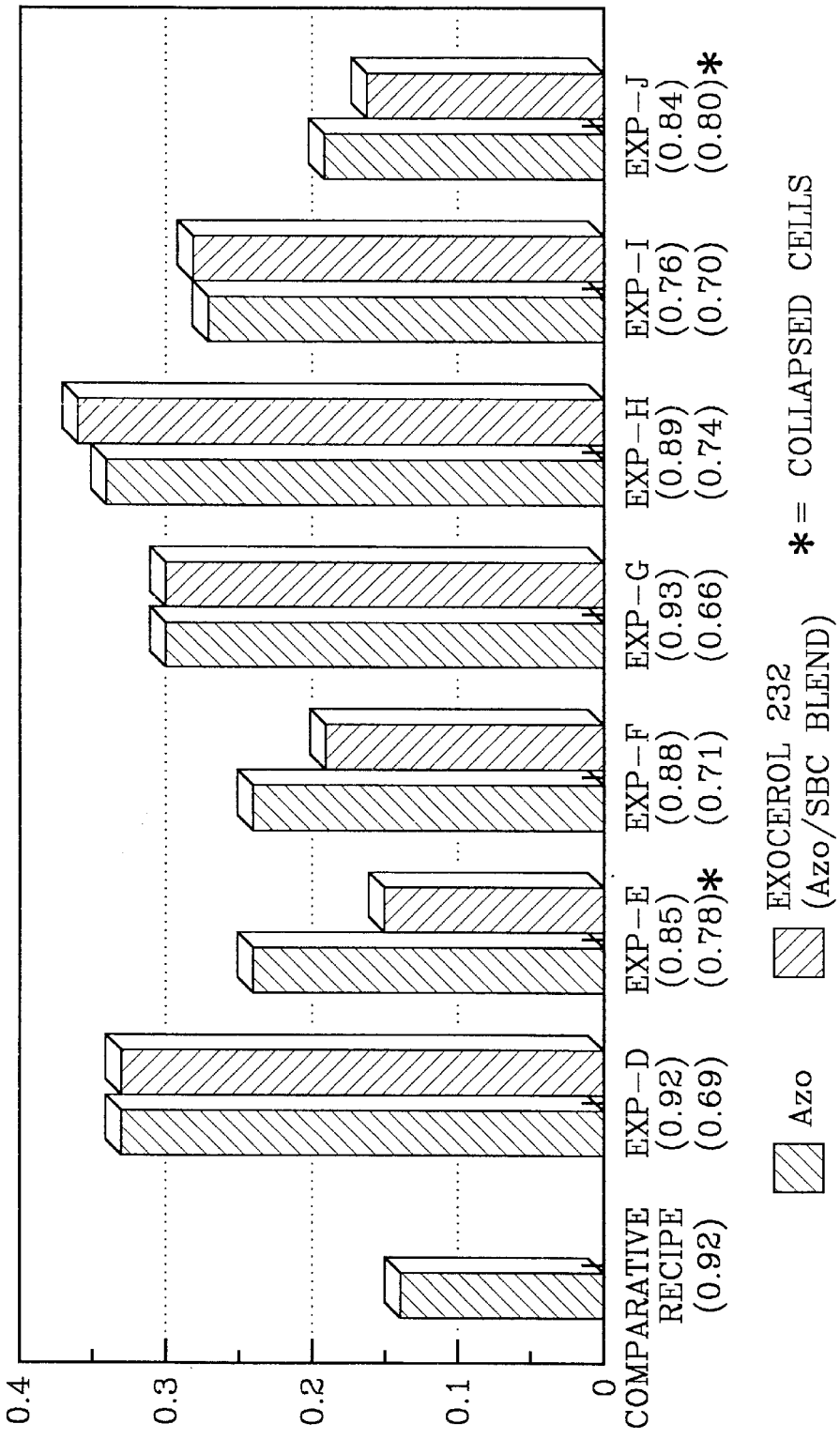
FIG. 5 compares the VHIT test of various experiments in the invention with a comparative recipe from U.S. pat. app. Ser. No. 08/580,563.

The bar graph in FIG. 5 compares the VHIT results as in ASTM D4226 with a ⅜" diameter Hemispheric Impactor (tup) of various experiments as designated therein to the following recipe in the U.S. patent application Ser. No. 08/580,563 (Comparative Recipe).

|  | Parts |
| --- | --- |
| Pellet A |  |
| TempRite 677x670 CPVC Resin | 100 |
| S-70 Tin Stabilizer | 3.5 |
| Thermolite 12 (Tin Dilaurate) | 0.5 |
| Paraloid K-400 (Acrylic Process Aid) | 8.0 |
| Paraloid K-175 (Acrylic Lubricant) | 1.0 |
| AC 629A (Oxidized Polyethylene Lubricant) | 1.5 |
| G-70 Beads | 0.5 |
| Glycolube 674 Lubricant | 0.5 |
| Tioxide R-FC 6 (Titanium Dioxide) | 4.0 |
| Pellet B—CBA Pellet 1 | 3% |

This Comparative Recipe compound has a profile density of 0.92.

The results in the bar graph of FIG. 5, indicate that using an impact modifier with a foamable CPVC composition in a skinless profile will generally in most instances result in a tougher, less penetrable profile as compared to a compound not having the impact modifier. This appears to occur whether an azodicarbonamide CBA system is used or whether a blend of a azodicarbonamide and bicarbonate is used. Furthermore, irrespective of the large density differences between the CBA used with Pellet A compound, the impact values of the foam remain essentially constant.

A comparative example using PVC was performed. The PVC recipe is set forth below in Experiment K.

| EXP K |  |
| --- | --- |
| 103EP F76 PVC, 0.92 IV by Geon Company | 100 parts |
| S-70 Dibutyl Tin Bis Isooctyl Thioglycolate Stabilizer Witco-Polymer Additives Group, Mark 292 S | 2.0 |
| Goodrite 2301x36, Acrylic Processing Aid, Zeon Chemical | 6.0 |
| Karie Ace B-22 KO, MBS Impact Modifier, Kaneka | 5.0 |
| Calcium Stearate, 6 extra dense, Witco Chemical Co. | 0.8 |
| Acuwax, Ethyl Bis Stearamide, Lonza Inc. | 0.8 |
| Wax "E", Montan wax w/dihyric alcohol, Hoechst Celanese | 0.4 |
| Tioxide R-FC6, Titanium dioxide, Tioxide America, Inc. | 5.0 |

Figure 6:
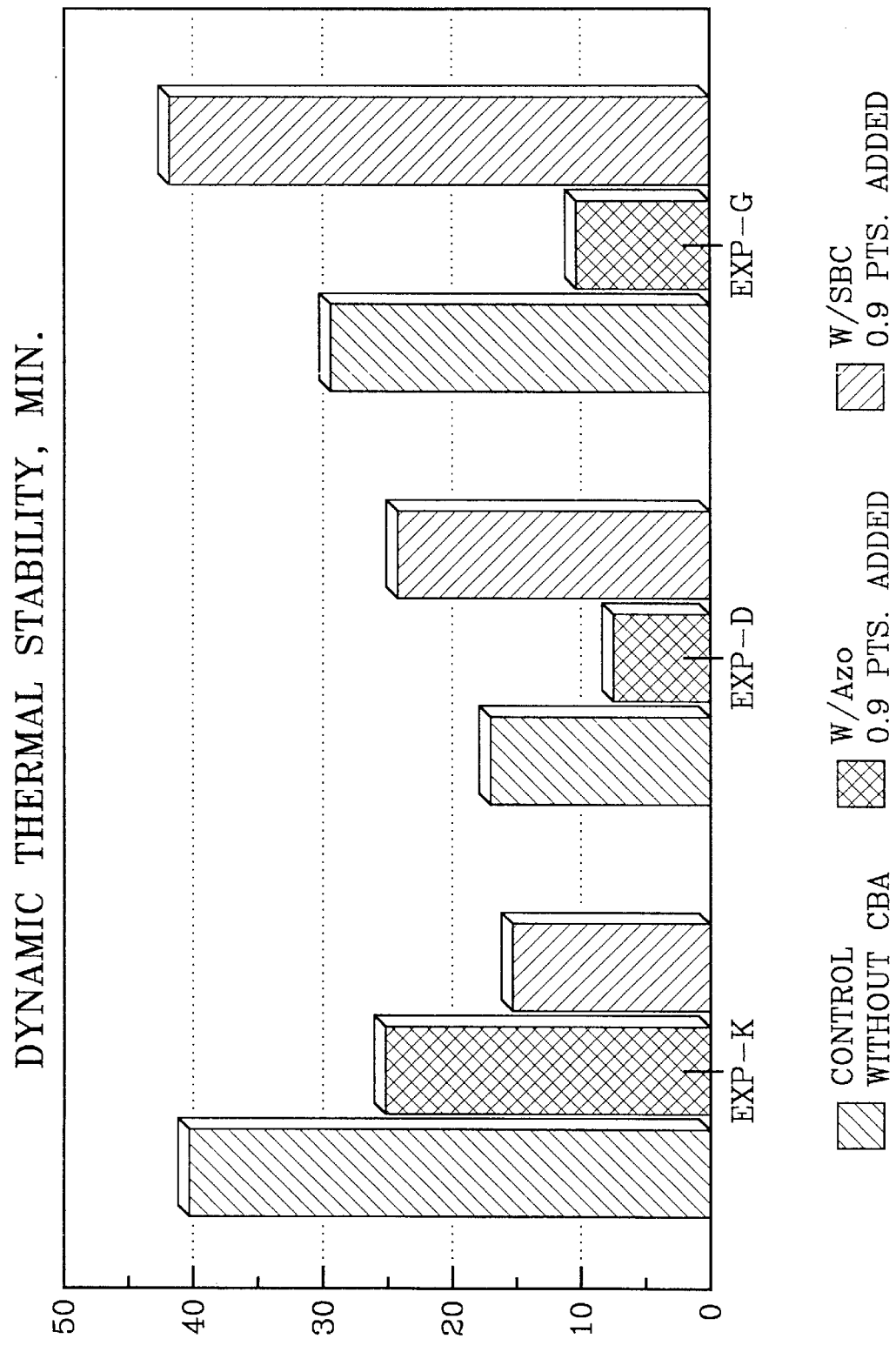
FIG. 6 compares the affect of a blend of blowing agents on PVC and CPVC, and CPVC with a costabilizer.
Figure 7:
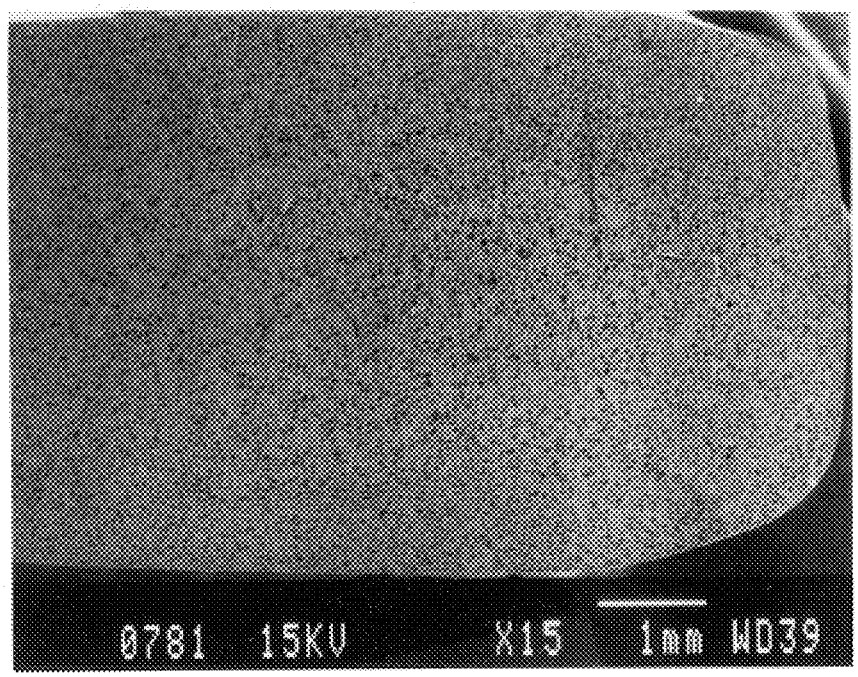
FIG. 7 is an electron micrograph at 15× magnification using a Scanning Electron Microscope (SEM) of a CPVC foamed by 100% azodicarbonamide blowing agent.
Figure 8:
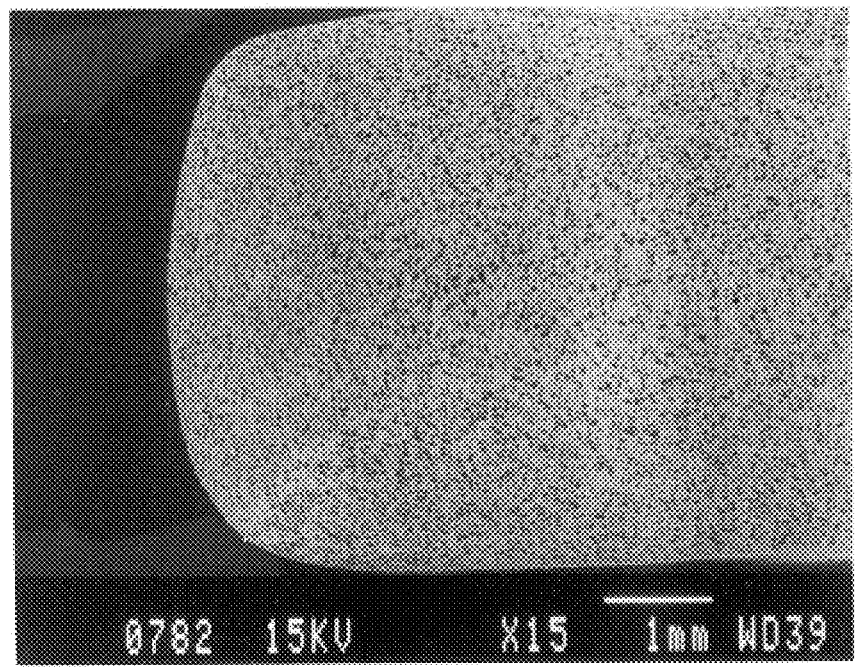
FIG. 8 is an electron micrograph at 15× magnification using a SEM illustrating a foamed CPVC sample using a 80/20 blend of blowing agent wherein azodicarbonamide is the major portion of the blowing agent.
Figure 9:
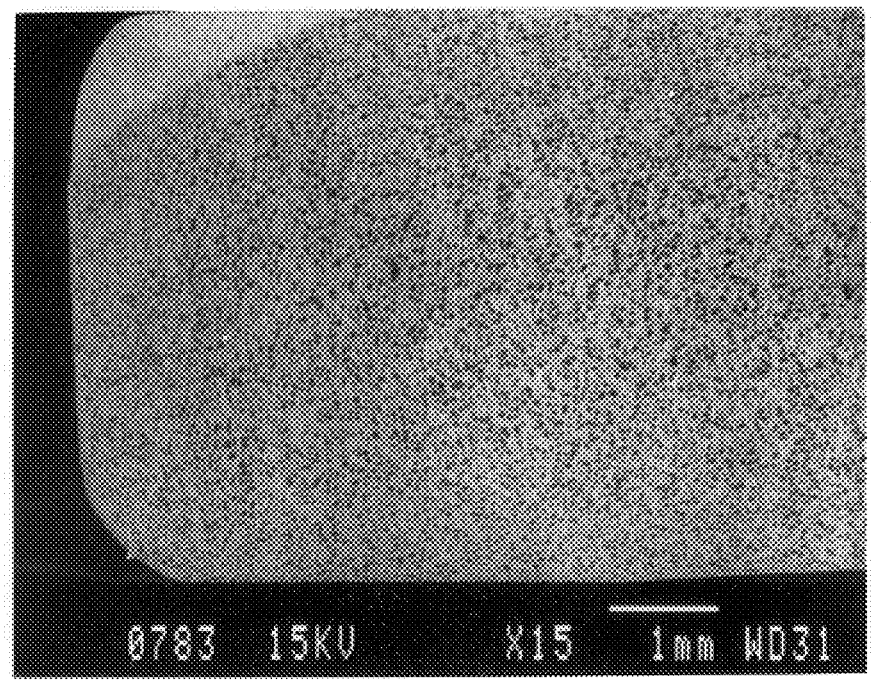
FIG. 9 is an electron micrograph at 15× magnification using a SEM illustrating a foamed CPVC sample using a 60/40 blend of blowing agent wherein azodicarbonamide is the major portion of the blowing agent.

The test results shown in bar graph form in FIG. 6. These results indicate the PVC polymers (Exp. K) thermal stability is negatively affected by both blowing agents. The sodium bicarbonate CBA catalyzes the degradation per unit weight more dramatically than the azodicarbonamide CBA. The CPVC polymer (Exp. D) without costabilizer has the thermal stability reduced by the addition of an azodicarbonamide blowing agent but the sodium bicarbonate blowing agent actually increases the stability beyond the original unfoamed CPVC. The polymer in Experiment G acted the same as the polymer in Experiment D with the following exceptions:

the azodicarbonamide CBA reduces the thermal stability of a co-stabilized CPVC compound to the same level as a non-costabilized CPVC compound.

the sodium bicarbonate CBA actually provides more thermal stability to the polymer than the original unfoamed CPVC compound with the costabilizer.

In summary, a novel and unobvious medium density CPVC foam has been described as well as the process of forming such a foam. Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A foamable composition comprising:

(a) chlorinated polyvinyl chloride;

(b) at least one blowing agent, said at least one blowing agent comprising a blend of a bicarbonate blowing agent and azodicarbonamide; and (c) at least one tin stabilizer wherein a foam composition made from the foamable composition has a specific gravity of at least 0.3 and not greater than 1.5.

2. A foamable composition in accordance with claim 1, wherein the blend comprises the bicarbonate blowing agent and azodicarbonamide in equal amounts.

3. A foamable composition in accordance with claim 1, further comprising polyvinyl chloride.

4. A foamable composition in accordance with claim 1, wherein the chlorinated polyvinyl chloride comprises a chlorinated polyvinyl chloride polymer blend.

5. A foamable composition in accordance with claim 1, wherein the chlorinated polyvinyl chloride comprises a chlorinated polyvinyl chloride co-polymer.

6. A foamable composition in accordance with claim 1, wherein the tin stabilizer comprises butyl tin thioglycolate.

7. A foam composition having a specific gravity of at least 0.3 and not greater than 1.5, said foam composition comprising:

(a) chlorinated polyvinyl chloride;

(b) at least one blowing agent, wherein said at least one blowing agent comprises a blend of a bicarbonate blowing agent and azodicarbonamide; and (c) at least one tin stabilizer.

8. A foam composition in accordance with claim 7 further comprising polyvinyl chloride.

9. A foam composition in accordance with claim 7, wherein the chlorinated polyvinyl chloride comprises a chlorinated polyvinyl chloride polymer blend.

10. A foam composition in accordance with claim 7, wherein the chlorinated polyvinyl chloride comprises a chlorinated polyvinyl chloride co-polymer.

11. A foam composition having a specific gravity of at least 0.3 and not greater than 1.5, said foam composition comprising:

(a) chlorinated polyvinyl chloride;

(b) at least one chemical decomposition product of a blowing agent, wherein said blowing agent comprises a blend of a bicarbonate blowing agent and azodicarbonamide; and (c) at least one chemical decomposition product of a tin stabilizer.

12. A foam composition in accordance with claim 11, further comprising polyvinyl chloride.

13. A foam composition in accordance with claim 11, wherein the chlorinated polyvinyl chloride comprises a chlorinated polyvinyl chloride polymer blend.

14. A foam composition in accordance with claim 11, wherein the chlorinated polyvinyl chloride comprises a chlorinated polyvinyl chloride co-polymer.

15. A foamable composition comprising:

(a) chlorinated polyvinyl chloride;

(b) at least one blowing agent, said at least one blowing agent comprising a blend of a bicarbonate blowing agent and azodicarbonamide;

(c) at least one tin stabilizer;

(d) at least one lubricant;

(e) at least one pigment; and (f) at least one chemical carrier for the blowing agent wherein a foam composition made from the foamable composition has a specific gravity of at least 0.3 and not greater than 1.5.

16. A foam composition having a specific gravity of at least 0.3 and not greater than 1.5, said foam composition preparable by a method comprising combining (a) chlorinated polyvinyl chloride;

(b) at least one blowing agent, said blowing agent comprising a blend of a bicarbonate blowing agent and azodicarbonamide; and (c) at least one tin stabilizer.

17. A foam composition in accordance with claim 16 further comprising combining polyvinyl chloride.

18. A foam composition in accordance with claim 16, wherein the chlorinated polyvinyl chloride comprises a chlorinated polyvinyl chloride polymer blend.

19. A foam composition in accordance with claim 16, wherein the chlorinated polyvinyl chloride comprises a chlorinated polyvinyl chloride co-polymer.

20. A method of making a foamable composition, said method comprising a step of: preparing a composition comprising:

(a) chlorinated polyvinyl chloride;

(b) at least one blowing agent, wherein said blowing agent comprises a blend of a bicarbonate blowing agent and azodicarbonamide; and (c) at least one tin stabilizer wherein the step of preparing is performed in such a manner that a foam composition prepared from the foamable composition has a specific gravity of at least 0.3 and not greater than 1.5.

21. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent.

22. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent, wherein combining the first mixture with at least one blowing agent comprises (i) preparing a second mixture comprising at least one blowing agent and (ii) combining the first mixture and the second mixture, wherein the second mixture can be prepared before the first mixture.

23. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent, wherein combining the first mixture with at least one blowing agent comprises: (i) preparing a second mixture comprising at least one blowing agent and (ii) combining the first mixture and the second mixture, wherein the second mixture can be prepared before the first mixture and wherein combining the first mixture and the second mixture comprises extruding the first mixture and the second mixture.

24. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent; wherein preparing a first mixture comprising the chlorinated polyvinyl chloride and at least one tin stabilizer comprises mixing and extruding the first mixture.

25. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent; wherein preparing a first mixture comprising the chlorinated polyvinyl chloride and at least one tin stabilizer comprises mixing and extruding the first mixture into pellets.

26. A method of making a foamable composition in accordance with claim 20, wherein said step of preparing comprises: (a) preparing a first mixture comprising the chlorinated polyvinyl chloride and at least one tin stabilizer; and (b) combining the first mixture with at least one blowing agent, wherein combining the first mixture with at least one blowing agent comprises (i) preparing a second mixture comprising at least one blowing agent and (ii) combining the first mixture and the second mixture, wherein the second mixture can be prepared before the first mixture, and wherein preparing the second mixture comprising at least one blowing agent comprises extruding the second mixture into pellets.

27. A method of making a foamable composition comprising steps of:

(a) preparing a first mixture, said first mixture comprising: (i) chlorinated polyvinyl chloride and (ii) at least one tin stabilizer;

(b) extruding the first mixture into first pellets;

(c) preparing a second mixture, said second mixture comprising at least one blowing agent, wherein said at least one blowing agent comprises a blend of a bicarbonate blowing agent and azodicarbonamide;

(d) extruding the second mixture into second pellets; and (e) combining the first pellets and the second pellets, wherein steps (a), (b), (c), and (d) do not have to be performed in sequential order as recited.

28. A method of making a foamable composition in accordance with claim 27, wherein the step of combining the first pellets and the second pellets is performed at a temperature that is lower than the reaction temperature of at least one blowing agent.

29. A method of making a foam composition having a specific gravity of at least 0.3 and not greater than 1.5, said method comprising steps of:
- (a) preparing a foamable composition comprising:
  - (i) chlorinated polyvinyl chloride,
  - (ii) at least one blowing agent, wherein said at least one blowing agent comprises a blend of a bicarbonate blowing agent and azodicarbonamide; and
  - (iii) at least one tin stabilizer; and
- (b) foaming the foamable composition to form a foam composition.

30. A method of making a foam composition in accordance with claim 29, wherein the step of preparing a foamable composition is performed at a temperature that is lower than the reaction temperature of at least one blowing agent and the step of foaming the foamable composition is performed at a temperature that is higher than the reaction temperature of at least one blowing agent.

31. A method of making a foam composition in accordance with claim 29, wherein the step of preparing the foamable composition comprises:
- (a) preparing a first mixture, said first mixture comprising the chlorinated polyvinyl chloride and the at least one tin stabilizer;
- (b) preparing a second mixture, said second mixture comprising at least one blowing agent; and
- (c) combining the first mixture and the second mixture
- wherein steps (a) and (b) do not have to be performed in sequential order as recited.

32. A method of making a foam composition in accordance with claim 29, wherein the step of preparing the foamable composition comprises:
- (a) preparing a first mixture, said first mixture comprising the chlorinated polyvinyl chloride and the at least one tin stabilizer;
- (b) extruding the first mixture into first pellets;
- (c) preparing a second mixture, said second mixture comprising at least one blowing agent;
- (d) extruding the second mixture into second pellets; and
- (e) mixing the first pellets and the second pellets,
- wherein steps (a), (b), (c), and (d) do not have to be performed in sequential order as recited.

33. A method of making a foam composition in accordance with claim 29, wherein the step of foaming the foamable composition comprises extruding the foamable composition.

34. A method of making a foam composition in accordance with claim 29, wherein the step of foaming the foamable composition comprises extruding the foamable composition at a temperature that is higher than the reaction temperature of at least one blowing agent.

35. A method of making a foam composition having a specific gravity of at least 0.3 and not greater than 1.5, said method comprising steps of:
- (a) preparing a first mixture, said first mixture comprising: (i) chlorinated polyvinyl chloride, (ii) at least one tin stabilizer, (iii) at least one impact modifier, (iv) at least one lubricant, (v) at least one pigment, and (vi) at least one processing aid;
- (b) extruding the first mixture into first pellets;
- (c) preparing a second mixture, said second mixture comprising: (i) at least one blowing agent, wherein said at least one blowing agent comprises a blend of a bicarbonate blowing agent and azodicarbonamide; and (ii) at least one chemical carrier for at least one blowing agent;
- (d) extruding the second mixture into second pellets;
- (e) combining the first pellets and second pellets to form combined pellets; and
- (f) extruding the combined pellets into the foam composition,
- wherein steps (a), (b), (c), and (d) do not have to be performed in sequential order as recited.

* * * * *